(12) United States Patent
Holschuh et al.

(10) Patent No.: US 12,490,780 B2
(45) Date of Patent: Dec. 9, 2025

(54) ACTIVE FABRICS, GARMENTS, AND MATERIALS

(71) Applicant: REGENTS OF THE UNIVERSITY OF MINNESOTA, Minneapolis, MN (US)

(72) Inventors: Bradley Thomas Holschuh, North Oaks, MN (US); Lucy Elizabeth Dunne, Minneapolis, MN (US); Rachael Granberry, Minneapolis, MN (US); Kevin Eschen, Minneapolis, MN (US); Julianna Abel, Minneapolis, MN (US); Nicole Ciavarella, Minneapolis, MN (US); Robert Michael Theodore Pettys-Baker, Minneapolis, MN (US); Nicholas Edward Schleif, Minneapolis, MN (US); Mary Ellen Margaret Berglund, Minneapolis, MN (US); Joonwoo Walter Lee, Minneapolis, MN (US); Sophia Victoria Vandycke, Minneapolis, MN (US)

(73) Assignee: REGENTS OF THE UNIVERSITY OF MINNESOTA, Minneapolis, MN (US)

( * ) Notice: Subject to any disclaimer, the term of this patent is extended or adjusted under 35 U.S.C. 154(b) by 569 days.

(21) Appl. No.: 16/768,537

(22) PCT Filed: Nov. 29, 2018

(86) PCT No.: PCT/US2018/063066
§ 371 (c)(1),
(2) Date: May 29, 2020

(87) PCT Pub. No.: WO2019/108794
PCT Pub. Date: Jun. 6, 2019

(65) Prior Publication Data
US 2020/0375270 A1 Dec. 3, 2020

Related U.S. Application Data

(60) Provisional application No. 62/697,789, filed on Jul. 13, 2018, provisional application No. 62/635,268, (Continued)

(51) Int. Cl.
*A41D 13/00* (2006.01)
*A41D 1/00* (2018.01)
(Continued)

(52) U.S. Cl.
CPC ............... *A41D 1/002* (2013.01); *A41D 1/06* (2013.01); *A41D 31/18* (2019.02); *A61F 13/08* (2013.01);
(Continued)

(58) Field of Classification Search
CPC .......... B29C 64/336; D04B 1/26; D04B 1/265
See application file for complete search history.

(56) References Cited

U.S. PATENT DOCUMENTS

| 4,682,588 | A  | * | 7/1987 | Curlee  | A61F 5/34 128/DIG. 20 |
| 6,289,702 | B1 | * | 9/2001 | Heirbaut | C03B 40/005 66/170 |

(Continued)

OTHER PUBLICATIONS

Elahinia, Mohammad et al. "Fabrication of NiTi through additive manufacturing: A review", Progress in Materials Science, Aug. 24, 2016. (Year: 2016).*

*Primary Examiner* — Victoria Murphy
*Assistant Examiner* — Savannah L Gabriel
(74) *Attorney, Agent, or Firm* — MERCHANT & GOULD P.C.

(57) ABSTRACT

Active fabrics can be created by combining active and passive materials. Active materials with shape memory or
(Continued)

other actuation characteristics can generate compression or dynamic fit, and the level of compression and/or change in fit can be determined by setting a knit index, wire diameter, and garment ease, or fit in relation to the body. Maximum compression can be set not only by varying physical properties of the knit structure but by built-in circuit breaking technologies, or by segmentation and control of the garment by a controller. In some embodiments, additive manufacturing can be combined with traditional textile equipment (e.g., circular knitting machine). Uniquely functional or active textiles can be made from additively manufactured, heterogeneous filaments. Yarn-like filament with varying properties (such as elasticity, stiffness, conductivity, activation, or surface properties) can be additively manufactured. This filament can be formed into a textile or garment with functional properties that are a results of emergent interactions between the heterogeneous filament components.

15 Claims, 38 Drawing Sheets

Related U.S. Application Data filed on Feb. 26, 2018, provisional application No. 62/635,285, filed on Feb. 26, 2018, provisional application No. 62/592,097, filed on Nov. 29, 2017.

(51) Int. Cl.

| | | |
|---|---|---|
| *A41D 1/06* | (2006.01) | |
| *A41D 31/18* | (2019.01) | |
| *A61F 13/08* | (2006.01) | |
| *A61H 1/00* | (2006.01) | |
| *A61H 11/00* | (2006.01) | |
| *D04B 1/12* | (2006.01) | |
| *D04B 1/26* | (2006.01) | |
| *H05B 1/02* | (2006.01) | |
| *H05B 3/34* | (2006.01) | |

(52) U.S. Cl.
CPC ............ *A61H 1/006* (2013.01); *A61H 11/00* (2013.01); *D04B 1/12* (2013.01); *D04B 1/265* (2013.01); *H05B 1/0202* (2013.01); *H05B 3/345* (2013.01); *A41D 2400/32* (2013.01); *A61H 2205/10* (2013.01); *D10B 2401/046* (2013.01); *D10B 2401/16* (2013.01); *D10B 2509/028* (2013.01); *H05B 2203/015* (2013.01); *H05B 2203/036* (2013.01)

(56) References Cited

U.S. PATENT DOCUMENTS

| | | | | |
|---|---|---|---|---|
| 6,846,561 | B1* | 1/2005 | Gownder | D01F 8/06 428/374 |
| 7,491,185 | B2* | 2/2009 | Couvillon, Jr. | A61H 31/005 601/149 |
| 8,424,116 | B2* | 4/2013 | Anastsopoulos | D04B 1/26 2/239 |
| 10,458,397 | B2* | 10/2019 | Ahn | F03G 7/065 |
| 2006/0122544 | A1* | 6/2006 | Ciluffo | A61B 5/015 601/79 |
| 2006/0270293 | A1* | 11/2006 | Yasui | A41D 31/14 442/310 |
| 2006/0281382 | A1* | 12/2006 | Karayianni | D03D 15/292 442/306 |
| 2007/0033711 | A1* | 2/2007 | Achtelstetter | A41B 11/00 2/239 |
| 2009/0234265 | A1* | 9/2009 | Reid, Jr. | A61H 9/0078 602/76 |
| 2010/0028686 | A1* | 2/2010 | Xie | B29C 61/0616 156/60 |
| 2011/0162414 | A1* | 7/2011 | Smith | D04B 1/126 57/200 |
| 2012/0000251 | A1* | 1/2012 | Hu | C08G 18/4238 139/384 R |
| 2015/0065930 | A1* | 3/2015 | Wyatt | A61H 11/00 601/150 |
| 2015/0073318 | A1* | 3/2015 | Holschuh | A61F 13/08 601/84 |
| 2015/0140886 | A1* | 5/2015 | Kapsali | D03D 15/292 442/353 |
| 2016/0186366 | A1* | 6/2016 | Mcmaster | D04B 1/24 28/143 |
| 2016/0213548 | A1* | 7/2016 | John | A61H 3/00 |
| 2017/0035120 | A1* | 2/2017 | Ramsey | D04B 1/12 |
| 2017/0318881 | A1* | 11/2017 | Fonte | A41D 31/14 |
| 2018/0177677 | A1* | 6/2018 | Pamplin | A61H 7/001 |
| 2019/0133873 | A1* | 5/2019 | Chase | A61H 9/0078 |
| 2019/0387813 | A1* | 12/2019 | Almog | A41C 5/00 |
| 2020/0000677 | A1* | 1/2020 | Pamplin | A61H 7/001 |

* cited by examiner

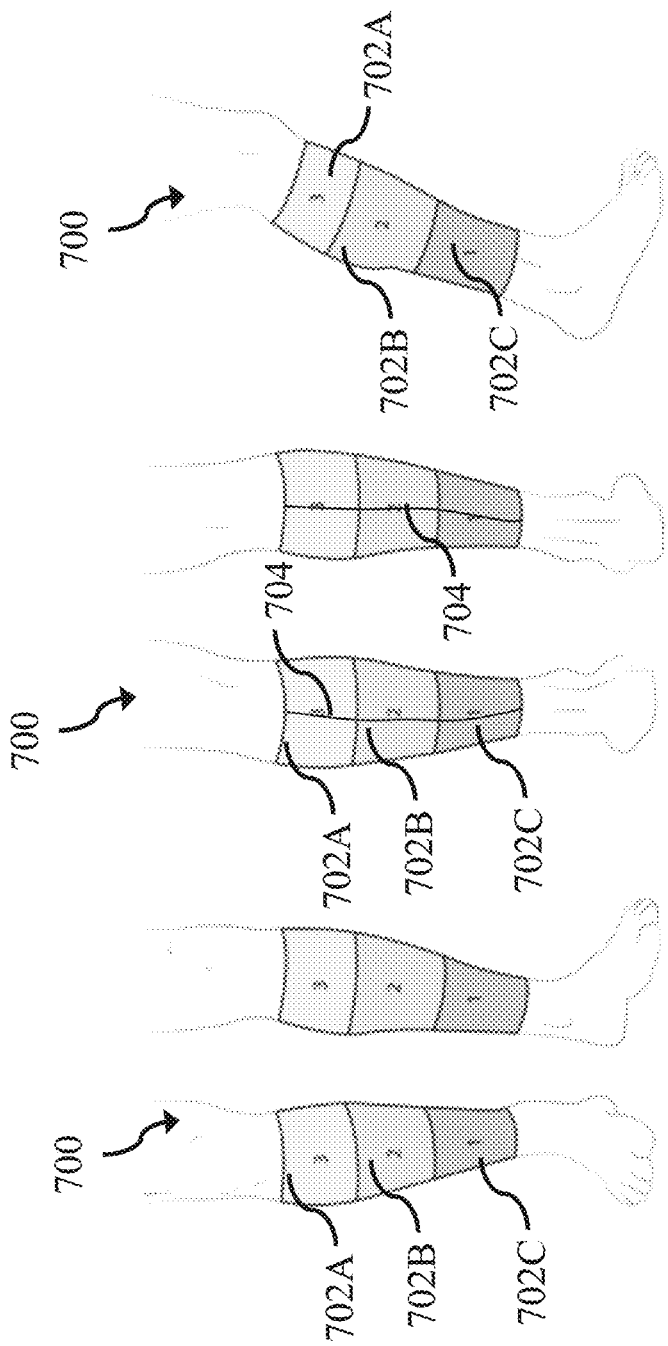

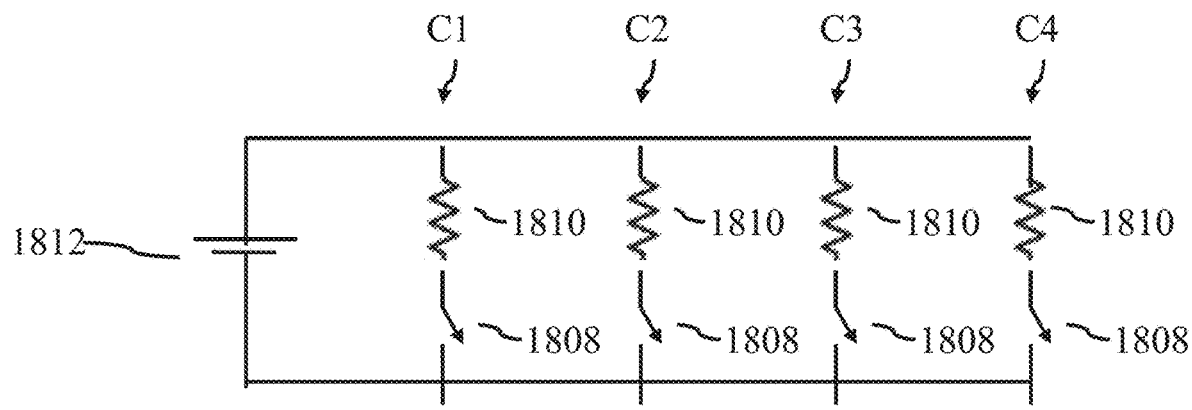
FIG. 18
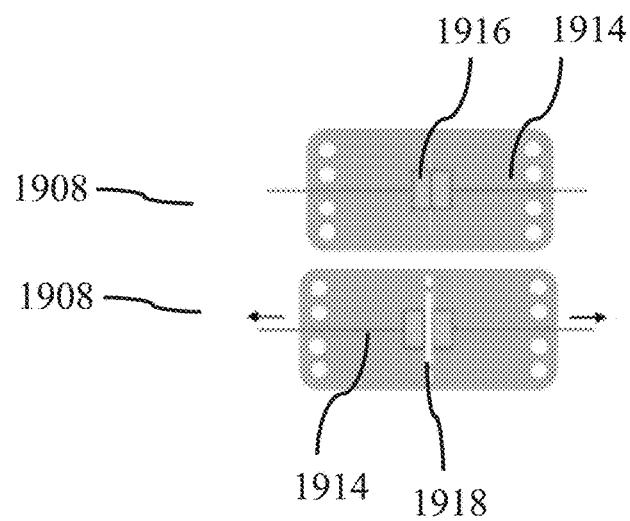
FIG. 19A
FIG. 19B

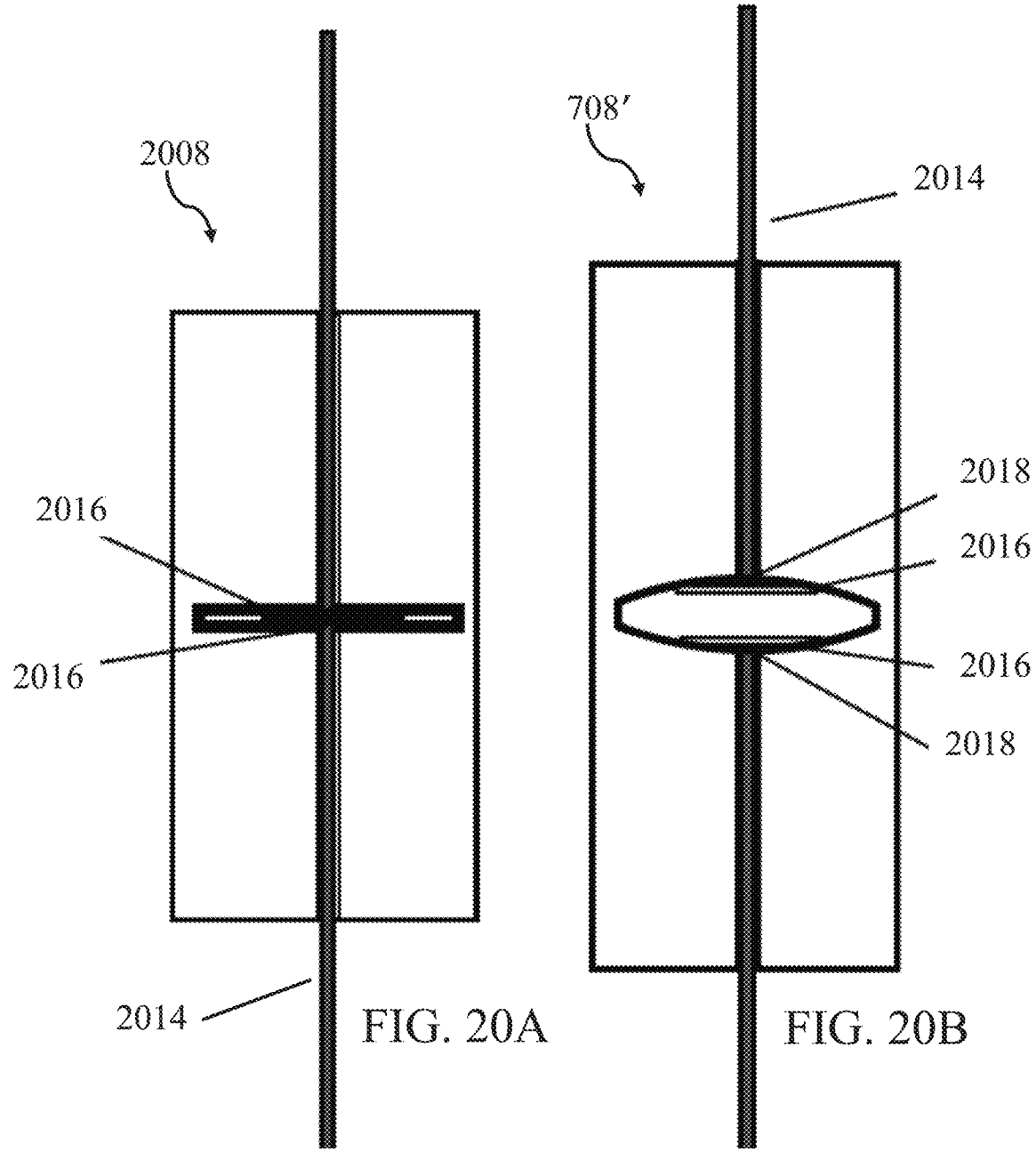

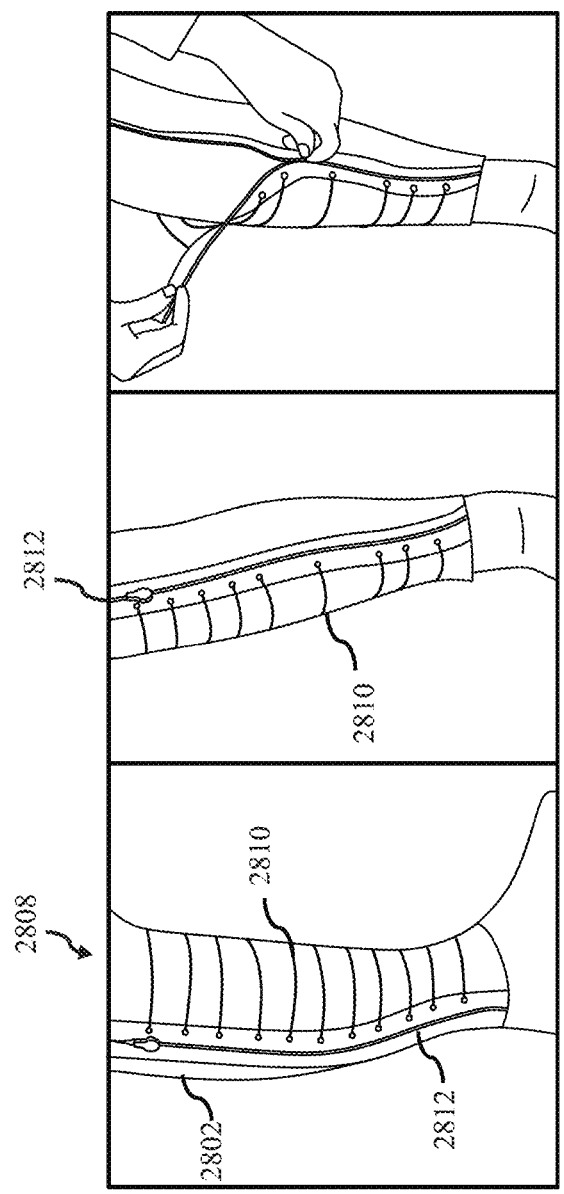

ACTIVE FABRICS, GARMENTS, AND MATERIALS

RELATED APPLICATION

The present application is a national stage entry under 35 U.S.C. § 371 from PCT/US2018/063066 filed Nov. 29, 2018, which in turn claims the priority benefits under 35 U.S.C. § 119 of U.S. Provisional Application No. 62/592,097 filed Nov. 29, 2017, U.S. Provisional Application No. 62/635,285 filed Feb. 26, 2018, U.S. Provisional Application No. 62/635,268 filed Feb. 26, 2018, and U.S. Provisional Application No. 62/697,789 filed Jul. 13, 2018, each of which is hereby incorporated herein in its entirety by reference.

TECHNICAL FIELD

Embodiments relate to materials that can produce functional effects in desired locations, patterns, and quantities for use in a variety of applications. Additionally, embodiments relate to fabrics and garments produced from such materials, and methods of making such materials, fabrics, and garments. Some embodiments described herein relate to devices for adjusting or maintaining mechanical tension, including use of tension limiting switches in shape memory fabrics, or the use of shape memory panels that transition to a tensioned, superelastic state upon donning or removal from a cooled environment, to provide garments that are easy to don and doff or produce a tailored fit for most wearers without the use of conventional fasteners.

BACKGROUND

Medical compression garments are worn articles of clothing that apply pressure to the body either through garment reduction (e.g., knit elastane shapewear) or through inflation (e.g., a blood pressure cuff). Compression is an effective medical treatment for disorders ranging from varicose veins and lymphedema to orthostatic intolerance and deep vein thrombosis.

Conventional compression garments, including elastic compression sleeves and inflatable compression systems, may aid in relief of these conditions but are also limited in usability. Fixed levels of compression in elastic materials may induce challenges in donning/doffing, complicating patient compliance. Conventional compression garments rely upon either under-sized or inflatable compression technologies. Under-sized elastic garments are typically associated with a particular portion of a user's body, such as a calf or forearm. The cross-section of the garment when relaxed is smaller than the cross-section of the portion of the body. When applied, the garment stretches and exerts force as the elastic contracts back towards its relaxed size. Other types of non-elastic, undersized compression technologies include oversized garments that can be made undersized by reducing the garment circumference after the garment has been donned by adjustable mechanisms, such as lacing, buckles, hook and loop tape, or straps.

Under-sized garments apply a substantially constant pressure on the portion of the user's body at each particular point. Depending on the user's anatomy, however, the amount of pressure can vary along the length of the garment. Although under-sized garments can be designed to provide substantially uniform pressure (or a desired pressure gradient) to a typical person, variations in user anatomy can result in variation from the intended pressure profile for that garment.

Another type of compression garment relies upon inflation of a garment. In aerospace medicine, for example, orthostatic intolerance garments (OIG) are a type of compression garment that acts as a countermeasure to and treatment for the high gravitational load experienced during astronaut reentry and landing on earth that otherwise can disrupt the body's mean arterial pressure, cause blood to pool in the lower limbs, and make cerebral perfusion difficult to maintain without external assistance.

In addition to medical context, garments with compression features have been used for aesthetic reasons. Aesthetics can be a key factor in adoption of a garment by consumers or by a patient who would benefit from wearing a compression garment, as poor design leads to dissatisfaction and noncompliance. Even where no therapeutic level of compression is needed, "athleisure" clothing has become popular, including which garments that exhibit some compressive force and are made to be stylish, form fitting, or shaping, as well as comfortable. Examples include leggings or active footwear, for example.

The pressure profile created by a garment (whether used for a medical or aesthetic purpose) can vary based upon the way in which it is used. The cross-sections of various body parts change depending upon whether the person is seated, standing, or lying down. Therefore an under-sized garment, which typically cannot be resized or reshaped depending on the user's activity level or body position, may apply different levels of compression for users with different levels or types of activity.

Each of these types of compression garments presents different technical challenges. Undersized compression garments do not provide tailored compression and can be too tight or too loose (or both, depending on the area), while inflated compression garments and knitted shape-memory garments require a supply of power to actuate the compression system and also typically a feedback system to monitor pressure.

Postural orthostatic tachycardia syndrome (POTS) is a clinical autonomic disorder characterized by a spike in heart rate and syncope in response to orthostasis, symptoms which then dissipate upon recumbence. Additional symptoms include chronic fatigue, bloating, and nausea. POTS predominately effects females (5:1) between the ages of 15 and 50 years. It is estimated 1 to 3 million are affected by POTS in the United States. While there is no known cure, symptom management requires a multifaceted approach, including physical exercise, counter maneuvers, high salt and fluid intake, and medications, including beta blockers and fludrocortisone. Lower body compression is a core component to POTS treatment, especially during prolonged periods of upright posture. Because POTS disproportionately affects young, otherwise healthy females who often have high physical and professional demands, compression garments (CG) can be critical to allowing this population to carry out their activities of daily living.

Pneumatic and undersized CGs are currently available to the consumer population for treatment of POTS. Compression can also be an effective medical treatment for disorders ranging from varicose veins and lymphedema to orthostatic intolerance and deep vein thrombosis. Inflatable garments provide effective, medically therapeutic pressures to the body. These inflatable garments such as leg sleeves are bulky, tethered to an inflation source, and inhibit joint mobility. Undersized CGs are a more practical solution for POTS patients, who are predominately symptomatic during periods of activity. Elastic knit stockings are low-profile and do not inhibit mobility, but they can exert unpredictable pressures and physicians report a high level of non-compliance amongst patients due to donning difficulties and reported discomfort.

Conventional compression garments, namely elastic compression sleeves and inflatable compression systems, may aid in relief of these conditions but are also limited in usability. Fixed levels of compression in elastic materials may induce challenges in donning/doffing, complicating patient compliance. Conventional compression garments rely upon either under-sized or inflatable compression technologies. Under-sized elastic garments are typically associated with a particular portion of a user's body, such as a calf or forearm. The cross-section of the garment when relaxed is smaller than the cross-section of the portion of the body. When applied, the garment stretches and exerts force as the elastic contracts back towards its relaxed size. Other types of non-elastic, undersized compression technologies include oversized garments that can be made undersized by reducing the garment circumference after the garment has been donned by adjustable mechanisms, such as lacing, buckles, hook and loop tape, or straps.

Other types of functional fabrics can provide other types of benefits. For example, functional fabrics can provide visual or auditory output, or they can be used for energy storage and conversion, or to monitor health or activity of a wearer. Functional fabrics also included components of heated garments that convert some type of energy, such as electrical energy stored in a battery, into thermal energy. Conventionally, wires, leads, or sensors can be inserted into fabrics, or fabrics can be formed around such objects, to provide the ancillary benefit of the functional fabric.

Shape memory alloys, and other smart materials can be electrically-controlled as a means to induce thermo-mechanical transformation which transforms a less-stiff material to an activated, higher-stiffness material. These states are referred to as martensite and austenite, respectively. For example, knitted garments of shape memory material can provide compression in a desired area, just as inflated garments do.

SUMMARY

According to embodiments described herein, an active fabric includes a first plurality of filaments, each of the first plurality of filaments comprising a passive material. The active fabric further includes a second plurality of filaments, each of the second plurality of filaments comprising an active material. The first plurality of filaments are arranged in a knit pattern with each of the second plurality of filaments, and the active material is a material that undergoes a phase transition at a predetermined temperature to generate a change in the fabric between a relaxed state and an activated state.

In some embodiments, the active material has a knit index corresponding to a medical compression level of between about 800 Pa and about 12 kPa in the active fabric. In some embodiments, the active material has a knit index corresponding to a non-medical compression level of less than about 800 Pa in the fabric. In some embodiments, a power source is configured to provide an electrical current to heat the first plurality of filaments. The power source can be configured to provide the electrical current through a circuit passing through the garment, and the active fabric can further include a plurality of switches configured to open the circuit when a compression level of the garment exceeds a predefined maximum of between about 1000 Pa and about 1333 Pa. The power source can be configured to provide the electrical current through a circuit passing through the garment, and wherein the circuit is selectively closed or open based upon a signal from a controller. The active material and the passive material can both be components of the first plurality of filaments. The first plurality of filaments can be additively manufactured. The predetermined temperature can be selected from the group consisting of freezer temperature (about −20° C.), ambient room temperature (about 20° C.), skin temperature (about 35° C.), and refrigerator temperature (about 0° C.). The active material can be a plurality of materials each having different predetermined temperatures. The fabric can further include a sensor.

According to another embodiment, an active fabric can include a first portion made of a first material and extending across a first plurality of rows of continuous filaments, each of the first plurality of rows of continuous filaments arranged in a pattern of loops, and a second portion made of a second material and extending across a second plurality of rows of continuous filaments, each of the second plurality of rows of continuous filaments arranged in the pattern of loops. At least one filament of the first plurality of rows of continuous filaments can also be a filament of the second plurality of rows of continuous filaments, and wherein a transition from the first material to the second material in the at least one filament occurs in less than the length of one loop of the pattern of loops.

The first plurality of rows of continuous filaments and the second plurality of rows of continuous filaments can both be additively manufactured. The first material can be an active material that undergoes a phase transition at a predetermined temperature to generate a change in the fabric between a relaxed state and an activated state. Each of the first plurality of rows of continuous filaments can have a knit index configured to generate a desired level of compression. The first material can be a conductive material.

According to another embodiment, a functional fabric can be made by the process of sintering an active material and an passive material to form a heterogeneous filament having an active portion and an passive portion, and knitting the heterogeneous filament into a fabric to form at least one active region made of the active material and at least one passive region made of the passive material, wherein the heterogeneous filament extends through both the active portion and the passive portion.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which:

FIGS. 7A-7C are front, back, and side perspective views, respectively, of a therapeutic active compression garment with varying active fabric panels according to an embodiment.

FIG. 18 is a circuit diagram of a four-segment active garment with embedded circuit-breaking switches according to an embodiment.

FIGS. 19A and 19B are plan views of an elastic circuit-breaking switch in a closed configuration and an open configuration, respectively, according to an embodiment.

FIGS. 20A and 20B are schematic views of an elastic circuit-breaking switch in a closed configuration and an open configuration, respectively, according to an embodiment.

FIG. 28A is a side view of a segmented compression insert in a garment, according to an embodiment.

FIG. 28B is a front view of the segmented compression insert in a garment of FIG. 28A.

FIG. 28C is a front view of the segmented compression insert in a garment of FIGS. 28A and 28B, in which the segmented compression insert has been partially detached from the garment.

Figure 1A:
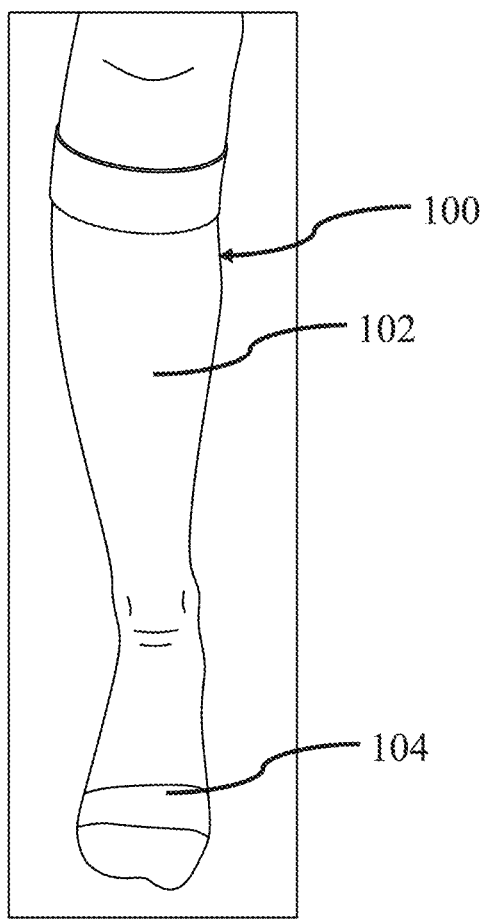
FIG. 1A depicts an under-sized compression garment.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

The following disclosure describes several different garments, materials, and knitting patterns that can be used to produce therapeutic garments and aesthetically improved garments. Garments described herein are based on interconnected loops (knits) or wound strands (springs) of shape memory alloy material, which can transition between a loose, flexible martensite state and an active, rigid austenite state. In one embodiment, when loops of these material are knitted together they form a functional fabric that contracts upon activation. Other embodiments described herein include specific improved yarns or filaments with desired properties.

Functional fabrics of all types described herein can provide actuation, sensing, energy harvesting, and communication as intrinsic fabric properties by integrating multifunctional fibers into designed textile geometries. The fiber material and the textile architecture can be designed to achieve functional fabric characteristics such as distributed actuation and sensing, variable stiffness, and complex, three-dimensional deformations. Through geometric design on the macroscopic and mesoscopic scales, knitted functional fabrics can achieve complex actuation deformations, such as corrugation, scrolling, and contraction. Additional, microscopic design parameters can be selected by the choice of multifunctional fiber and its specific material properties. Specific patterns and materials can be used to generate desired compression for either therapeutic, aesthetic, or other functional purposes such as the elimination of traditional fasteners that are required for non-compressive fabrics.

Throughout this disclosure, several specialized terms related to active knitted fabrics are used. The first is "knit index," which is the ratio of the area of a loop of active material enclosed in the martensite state and the square of the active knit material wire diameter. Depending on the knit index among other factors, a functional fabric with desired properties can be created. Two particularly important properties are the pressure applied by the fabric (i.e., how forcefully a garment made of the active fabric squeezes when the active material is actuated) and the actuation contraction of the fabric (i.e., the normalized difference of the unactuated and actuated fabric lengths). Actuation contraction of an active knit fabric is a function of the martensite length $l_M$ and the austenite length $l_A$:

$$\xi = (l_M - l_A)/l_M,$$

Depending on the knit index, the diameter of the active material, and other factors, different types of active fabrics can be created. One type of fabric is referred to herein as a "therapeutic compression garment," and it is designed primarily to provide a therapeutic level of compression to a wearer. Accordingly, the level of force applied by the fabric when activated should preferably reach a desired minimum level, while the total actuation contraction is of lesser importance.

A second type is referred to as a "self-fitting" garment, which is not intended to provide therapeutic compression but rather to contract to an accurate fit for the wearer. Accordingly, the level of force applied by the garment should be smaller than that of a therapeutic compression garment, while the total displacement should be larger. Other garments, fabrics, or portions thereof can be made of "passive" material, which refers to materials that do not exhibit a shape-memory transition.

Use of a variety of fabric components of patterns can create garments that improve upon existing compression garments by providing features such as a passive tension-feedback system incorporated in series with embedded shape memory alloy filaments, or filaments made of other smart materials that can transform between an active, constrictive state and a passive, loose state upon a controlled change in stimulus (e.g. temperature, magnetic field). The resulting smart fabric will undergo shape memory change to provide compression only when the tension in the active component is below a threshold. In the event that the level of compression in a portion of the garment exceeds the threshold, "circuit breaker" switch elements in the garment disconnect the electrical power from that portion of the garment, which stalls resistive heating until the portion of the garment has cooled and relaxed sufficiently to reduce the tension to a desired level.

In some embodiments, the shape memory alloy elements are configured to change between martensite and austenite forms upon donning the garment, based on ambient conditions. For example, in some embodiments exposure to room temperature causes the garment to change from martensite to austenite. Alternatively, in other embodiments exposure to skin temperature is sufficient to cause the garment to change from martensite to austenite. The shape memory transition causes compression of the garment, such that an initially loose-fitting garment will become a compression garment that is tight fitting up to, and including, tight enough to act as a clinical compression garment.

Materials are described herein that can be used to generate active fabrics, including fabrics that include active components in specific locations. Filaments are described herein that include multiple heterogeneous portions, at least some of which are made of active materials. Active materials are those that have some active or functional properties, such as actuatable mechanical components (e.g., piezoelectrics, electro-mechanical components, thermo-mechanical components, and shape memory materials), electrically functional components (e.g., conductive, semiconductive, or photoelectric materials), or actuatable thermal components (e.g., materials that undergo exothermic or endothermic reactions upon exposure to stimulus, or electrically resistive materials that produce heat upon exposure to an electrical potential).

In embodiments the filament can be incorporated into a yarn, which is a combination of filaments. Alternatively, in embodiments the filament can be incorporated into a thread, which comprises multiple yarns bound in a braid pattern. Each of the filaments that make up a yarn or a thread can be a functional filament, or in embodiments functional threads can be interspersed among non-functional filaments.

In embodiments, functional fabrics can be manufactured from multi-material or heterogeneous filaments. The multi-material filaments can be additively manufactured to create transitions between materials within a short distance relative to the loops of the knitted structure. Thus fabrics can be created from filament such that the fabric has precisely placed features. The precisely placed features can include electrically conductive or insulative portions, shape-memory portions, piezoelectric portions, elastic or inelastic portions, and any other mechanical, electrical, or thermal features.

By additively manufacturing the filament, functional features can be integrated into the fabric that have different physical characteristics compared to a functional fabric that is additively manufactured in situ. For example, each of the yarns, threads, or filaments of a knitted material that is additively manufactured in situ will be unstressed in the absence of some outside force acting upon the fabric. In contrast, when a yarn, thread, or filament is integrated into a knitted structure, the yarn, thread, or filament is deformed into loops to fit into the structure of the rest of the fabric. This deformation results in tension on each individual yarn, thread, or filament, even when the overall fabric is not being acted upon by any external force. Therefore, a knitted active fabric behaves differently from one that is built in place by an additive manufacturing machine, which cannot form objects that are under tension in their resting state.

Compression Garments

Figure 1B:
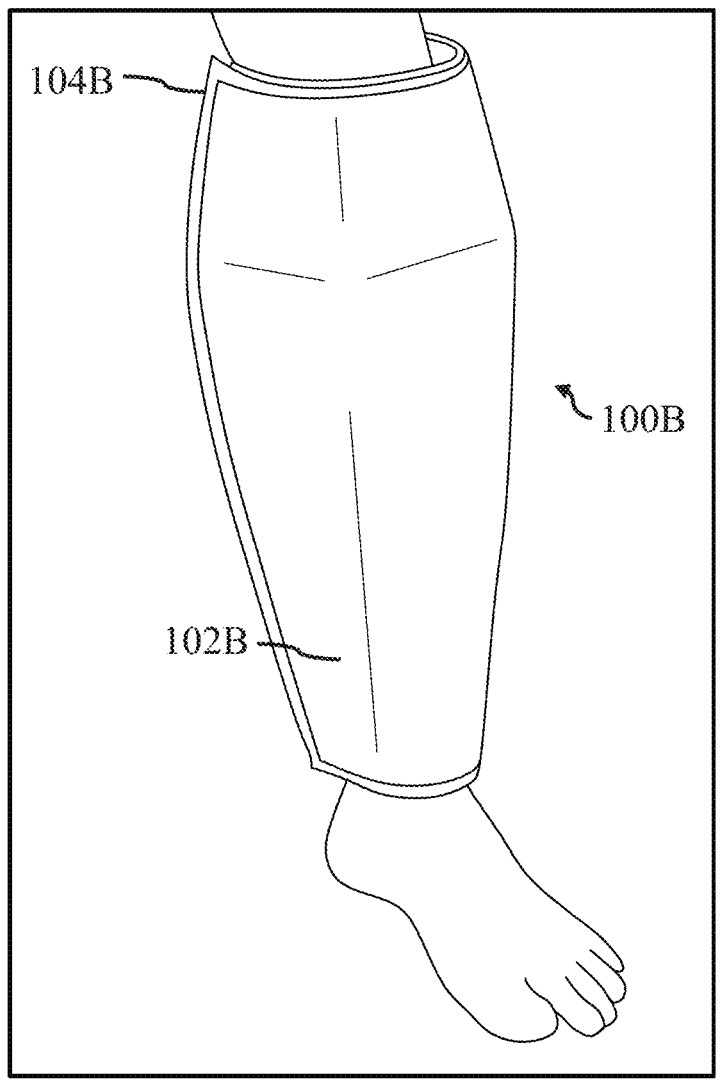
FIG. 1B depicts an active compression garment within an outer covering.
Figure 2:
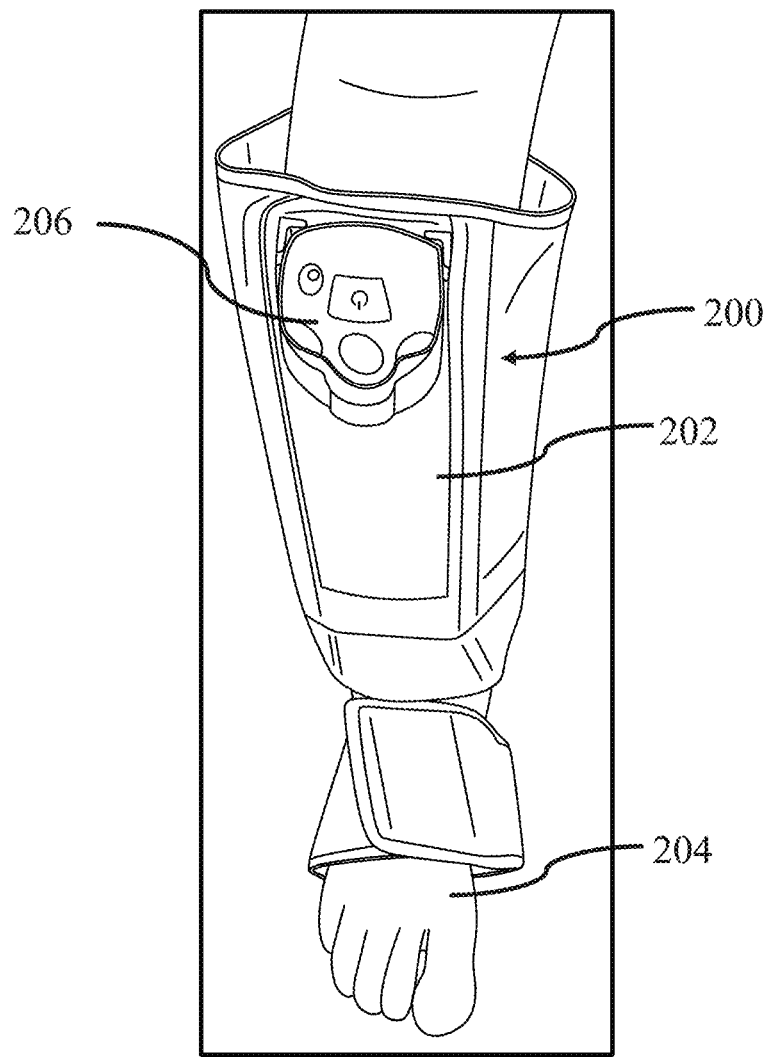
FIG. 2 depicts a passive fabric garment that is a pneumatic compression garment.

FIGS. 1A and 2 relate to passive fabric compression garment technologies, while FIG. 1B shows an actuatable insert device within an outer sleeve that could provide passive fabric compression.

FIG. 1A shows an under-sized compression garment 100 applied to a user's calf 102 and foot 104. When donned, under-sized compression garment 100 applies pressure on calf 102 and foot 104 based upon the amount garment 100 is stretched. As shown in FIG. 1, under-sized garment 100 is tubular in shape, with a circumference that varies along its length. Typically, under-sized garment 100 has an unstretched circumference that is smaller than a body part that it is used with. Therefore in order to don the garment 100, it is necessary to pre-stretch the garment 100. In more complex garments, pre-stretching the garment becomes more burdensome. For example, some garments are worn on parts of the body that are smaller than the area they must pass over to be donned. In one example, a shirt must be stretched to pass over a user's head, even though the garment should preferably ultimately be sized to fit on a smaller region such as around the neck. In another example, a pair of pants includes a portion that is worn around the user's ankles or calves, but the entire garment must be stretchable to fit over the user's foot, which has a much larger cross-section.

FIG. 1B shows an alternative compression garment 100B. Compression garment 100B contains a shape-memory component (shown and described in more detail with respect to FIGS. 16 and 17, below). As shown in FIG. 1B, compression garment 100B is designed to surround a body part. In FIG. 1B, for example, compression garment 100B wraps around the calf of a user. Compression garment 100B shown in FIG. 1B includes outer layer 102B, which is a fabric. In various embodiments, outer layer 102B could be any number of fabrics or other materials. Generally, outer layer 102B is passive and provides a layer of protection for the active materials housed therein, described in more detail below with respect to FIGS. 16 and 17.

FIG. 1B also depicts a fastener 104B, which can be corresponding strips of hook and loop material, a zipper, one or more sets of hooks and eyes, one or more snaps, one or more switches, or some other fastening or coupling mechanism to couple outer layer 102B to itself and at least loosely hold compression garment 100B onto the user.

Conventional under-sized garments relying solely on elasticity to provide desired compression must overcome several obstacles in order to be useful. The tension properties or stiffness of the elastane must be high enough to provide the desired compression while still remaining loose enough that the garment can be stretched during donning or doffing of the garment. Some known industry standards are used to measure tension and elongation to quantify fabric stiffness for medical compression. In order to achieve the desired goals of increasing tension or stiffness while remaining loose (and elongatable) for donning and doffing, conventional compression garments can incorporate high-elongation fabrics as well as any of a number of fasteners such as zippers, snaps, or ties that can be fastened after the garment has been positioned on the user's body to increase the compression on a desired region.

FIG. 2 shows a pneumatic garment 200 applied to a user's calf 202 and a portion of the user's foot 204. Pneumatic garment 200 is significantly bulkier than under-sized compression garment 100 of FIG. 1. Pneumatic garment 200 is capable of providing controlled and variable amounts of pressure, unlike under-sized compression garment 100 of FIG. 1. Pneumatic garment 200 of FIG. 2 includes a set of controls 206 that can be manipulated to increase or decrease the applied pressure. By pumping air into pneumatic garment 200, the thickness of the garment is increased and pressure on the calf 202 and/or foot 204 is increased.

Unlike under-sized compression garment 100, pneumatic garment 200 is capable of increasing or decreasing pressure during use. Pneumatic garment 200 also adjusts somewhat for changes in circumference of the body part that can result from sitting, standing, lying down, or other movements or changes in position. Pneumatic garment 200 is substantially heavier and bulkier than under-sized compression garment 100, as it includes controls 206 and associated pumps, valves, sensors, and power storage such as a battery necessary to transfer and hold air at above-atmospheric pressure.

Therapeutic Active Compression Garments

FIGS. 3-8 relate to therapeutic active compression garments.

Figure 3:
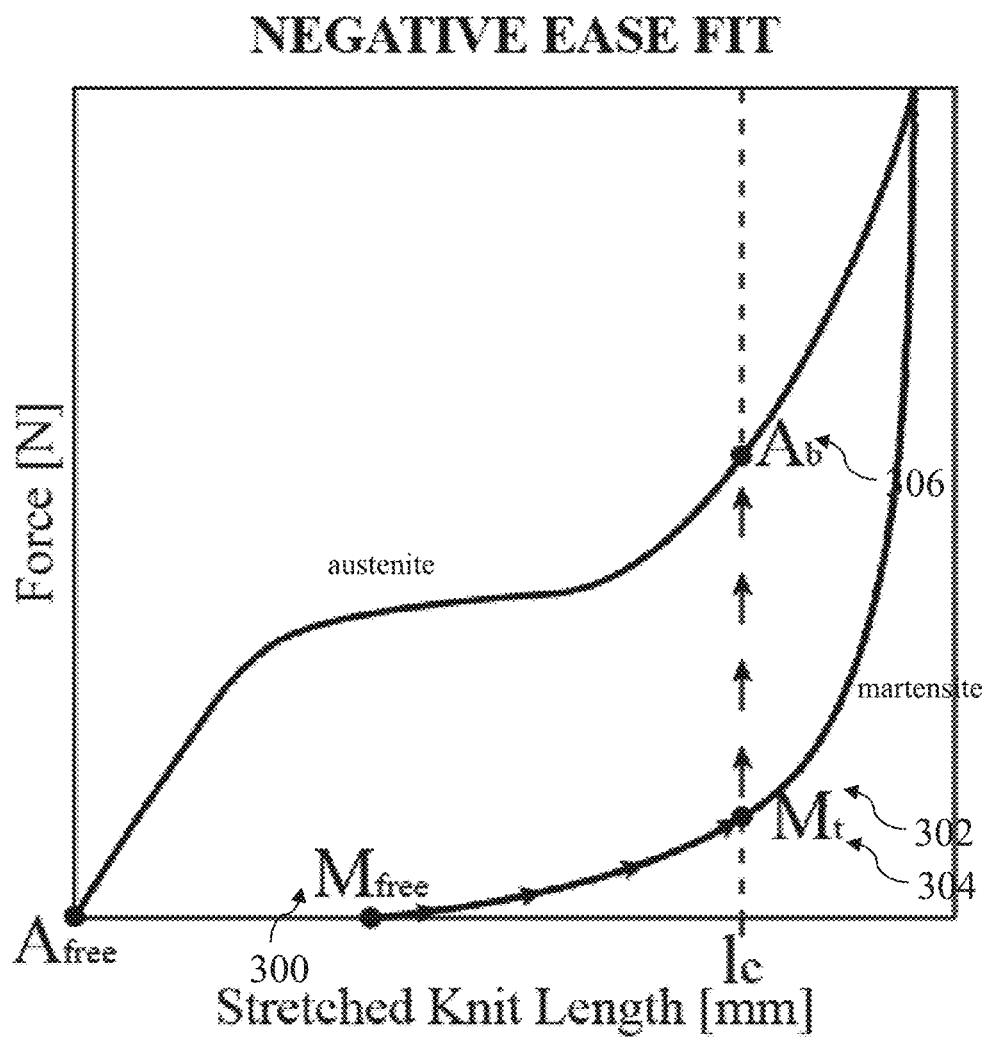
FIG. 3 is a force-length diagram for a therapeutic active shape memory alloy compression garment according to an embodiment.

FIG. 3 is a chart of a theoretical model for the force and length of a therapeutic compression garment. Force applied to the fabric or garment, shown on the y axis, can be used to determine a total tension using a tensile test that measures a fabric's tension (T) at specific lengths, $$T = F/w$$

where the recorded force (F) is divided by the measured fabric width (w). By determining the tension values of the fabric, the pressure exerted by the fabric on a body can be determined for specific fabric lengths. In one example, an orthostatic intolerance lower body garment exerts between about 6 mmHg and about 77 mm Hg (about 800 Pa and about 12 kPa) on the body. The range of fabric tensions required for this garment can be determined using the Hoop Stress formula, Laplace's formula, and Macintyre's formula:

Hoop Stress formula:

$$\delta_\theta = F/tw$$

where $\delta_\theta$=hoop stress, F=force in N, t=fabric thickness in m, w=fabric width in meters.

Laplace's formula:

$$P = (t\delta_\theta)/r$$

where P=pressure in Pa, t=fabric thickness in m, $\delta_\theta$=hoop stress, r=limb radius in meters. Macintyre's modified formula:

$$P = (t(F/tw))/r,$$

i.e., P=(F/w)/r, because T=F/w and the t's cancel out; i.e., P=T/r where P=pressure in Pa, T=fabric tension in N/m, r=limb radius in meters.

Anthropometric data can be gathered to determine the limb radius. The anthropometric data can be specific to a patient, or in embodiments standard or common sizes can be used to generate garments that are appropriate for many wearers. In this example, if the average leg radius is 0.049 meters, $$\text{Lowest pressure: } 799.9 \text{ Pa} = \frac{T}{0.049 \text{ m}},$$

then $T = 799.9 \text{ Pa} * 0.049 \text{ m}$, then $T = 39$ N/m $$\text{Highest pressure: } 10265.8 \text{ Pa} = \frac{T}{0.049 \text{ m}},$$

then $T = 10265.8 \text{ Pa} * 0.049 \text{ m}$, then $T = 503$

N/m.

So to provide the desired level of compression, the fabric should exhibit tensions levels between 39 and 503 N/m.

Returning to FIG. 3, at 300 the therapeutic garment is an undersized garment in the martensite state. No force is being applied by or to the garment. At 302, some force is applied to the garment to stretch it over the user. The garment remains in the unactivated martensite state, so the length of the garment increases along the bottom curve in FIG. 3 as force is applied to stretch the garment.

At 306, the fabric that makes up the garment is actuated, such as by application of heat. This actuation, or transition from martensite to austenite phase, causes an increase in applied force (i.e., compression), even though there is little to no change in the length of the fabric. The garment size enters a "blocked state" in which it cannot move, but force increases.

The garment can be changed back to martensite to be removed, or in embodiments the state of the fabric can be alternated between austenite and martensite to provide pressure pulses or other therapy, as described in more detail below.

Figure 4A:
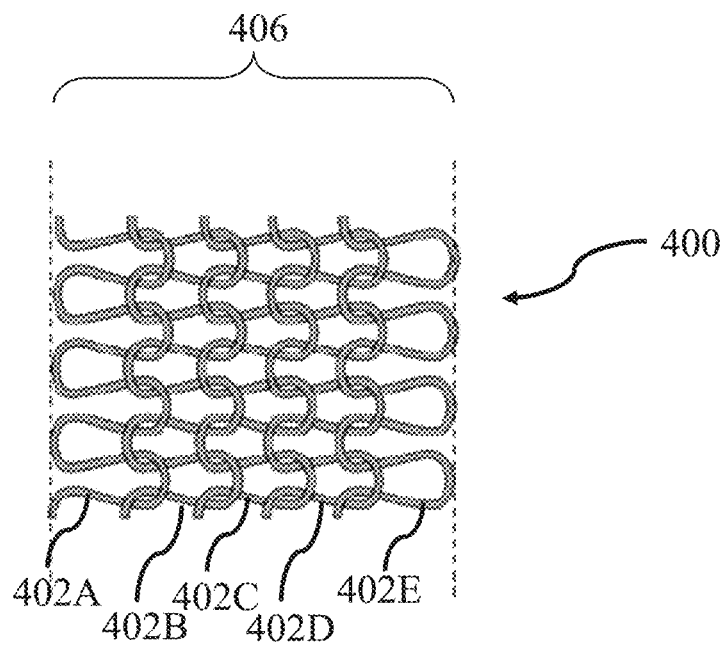
FIGS. 4A and 4B are plan views of the active fabric for a therapeutic compression garment with weft knit active yarns in relaxed and contracted states, respectively, according to an embodiment.
Figure 4B:
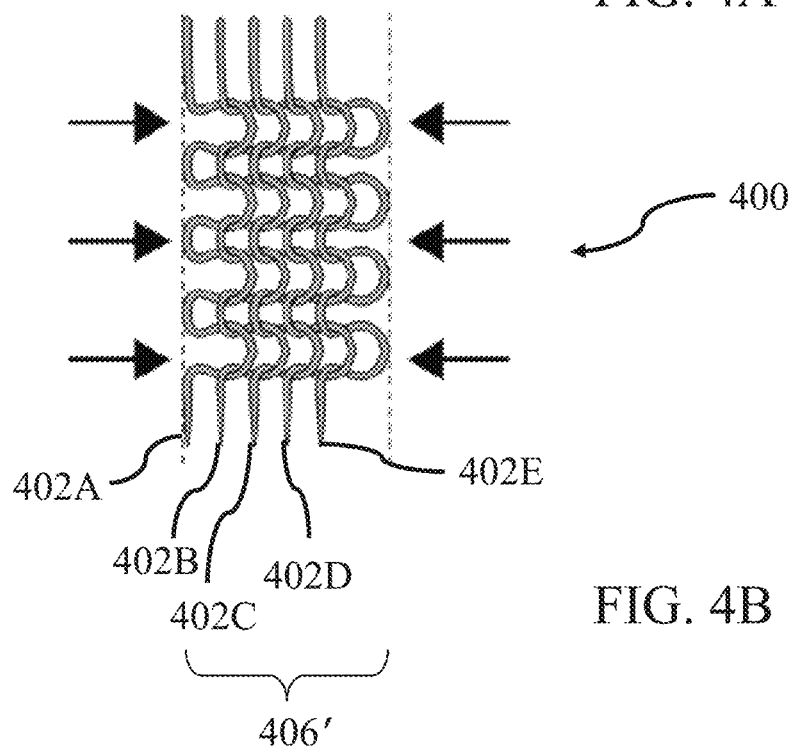

FIGS. 4A and 4B are plan views of fabric 400 made of a series of rows of weft knit active yarns in relaxed and contracted states, respectively, according to an embodiment. Fabric 400 includes five rows (402A, 402B, 402C, 402D, 402E) of an active yarn material. The term "active yarn material" can refer to any thread, strand, filament, braid, or bundle of materials that responds to thermal or electrical stimulation to change from a relaxed state to an activated state. In embodiments, braided or coaxial bundles can provide a relatively higher level of strength than individual filaments and can also provide more force when switching between relaxed and activated states.

The active yarn material that makes up each of the rows 402A, 402B, 402C, 402D, 402E can comprise a shape memory alloy (SMA). In embodiments, the SMA can be a type of active metal with shape memory properties that is highly malleable in a cool, martensite phase and has shape recovery abilities, even under load, during the elastic austenite phase. In one embodiment, the active yarn material can be a nitinol material. SMAs can be engineered to switch from martensite to austenite depending on whether they are above or below a material-specific transition temperature.

SMAs can be engineered to exhibit desired properties by altering the material composition and the heat treatments. Specifically, stress, strain, recovery, and activation temperature are functional properties that can be manipulated through the thermomechanical manufacturing process. Consequently, SMAs can be designed to activate at specific temperatures to require relatively low power consumption and temperature loads on the body compared to powered, pneumatic systems.

Knit structures such as fabric 400 can be used in large, complex structures that are actuated across complex surfaces (such as the surface of the body). The variety of structures that can be created with interlocking loops or stitches within each row (e.g., rows 402A, 402B, 402C, 402D, 402E) and the shape change that occurs when these loops are subject to tension can be customized to the contours of a particular body part such as a leg or arm.

Knitting can be divided into two general architectures: (1) weft knitting, which is a process in which an individual end of yarn is fed into or knit by one or more needles in a crosswise (lateral) fashion, and (2) warp knitting, which is a process in which a multiplicity of yarns are fed into or knit by one or more needles in a lengthwise (vertical) fashion. While weft knits have more mechanical stretch, warp knits are often more stable architectures and can be constructed using many wales, or columns, of yarn. Additional yarns can be introduced into weft knit structure by utilizing a jacquard system, which selectively engages and disengages needle beds to form a knit pattern using multiple yarns. Warp knits can also achieve complex patterning through the use of guide bars, which allow some warp knit structures (e.g., raschel knits) to appear like lace-structures. Hand-knitting (a weft knit structure), lace-making, crocheting, tadding, and needle-lace are other manual methods of selectively looping yarns into a fabric structure. Complex patterns can be achieved using other techniques such as hand-knitting, lace-making techniques, or others, which can be used to loop yarns selectively into the fabric structure. Although FIGS. 4A and 4B depict a simple weft pattern, other embodiments can include a variety of relatively more complex knitting stitches and patterns including warp knitting, jacquard, intarsia, Fair Isle, or any other knitting pattern and combinations thereof.

FIG. 4B shows the same five rows 402A, 402B, 402C, 402D, 402E of active material described above with respect to FIG. 4A, but in FIG. 4B the rows 402A, 402B, 402C, 402D, 402E are in a compressed state indicated by arrows. Fabric 400 can change from the relaxed state shown in FIG. 4A to the compressed state shown in FIG. 4B due to a change in temperature. For example, the active material can have a transition temperature, and once each of the rows 402A, 402B, 402C, 402D, 402E becomes hotter than that transition temperature the active material can transition from martensite to austenite, and vice versa.

As shown in FIGS. 4A and 4B, depending upon the state of the rows of an active material, the overall width of the fabric can vary. Width of an active fabric can be relatively wider in the relaxed state, and relatively narrower in the activated state. A user can change between these two states by heating or cooling the rows. To heat the rows, electrical current can be routed through some or all of the rows. Alternatively, an adjacent liner can provide heat or cooling to fabric to cause it to change between activated and relaxed states.

A fabric made of a shape memory alloy or other active knit material can be modified to form other fabric types or patterns by changing any of at least five features. First, the relative number of active yarns to passive yarns (as described in more detail below with respect to FIGS. 5A-5C) can be varied to provide different levels and targeted areas of compression. Second, the stitch size or relative density (i.e., gauge) of the stitches can be modified to affect the knit index $i_k$. Third, current and voltage (or power dissipation) through the active yarns can be controlled to affect activation of each of the active yarns. Fourth, the weight or diameter of the yarn (which can be either a single filament or a bundle of active filaments) can be modified, with thicker yarns generally providing a higher level of compression upon activation. Finally, the transition temperature of the active yarns can vary between embodiments, and in fact within segments of the same fabric, to create zones as described in more detail below. Zones that have different transition temperatures will activate at different times, even under uniform heating or cooling.

Figure 5A:
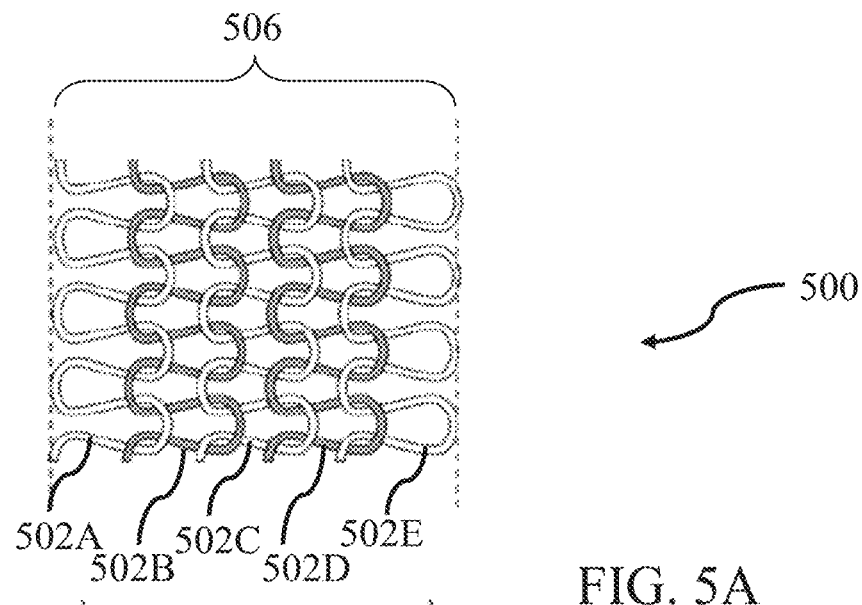
FIGS. 5A and 5B are plan views of the active fabric for a therapeutic compression garment with weft knit active and passive yarns in relaxed and activated states according to an embodiment.
Figure 5B:
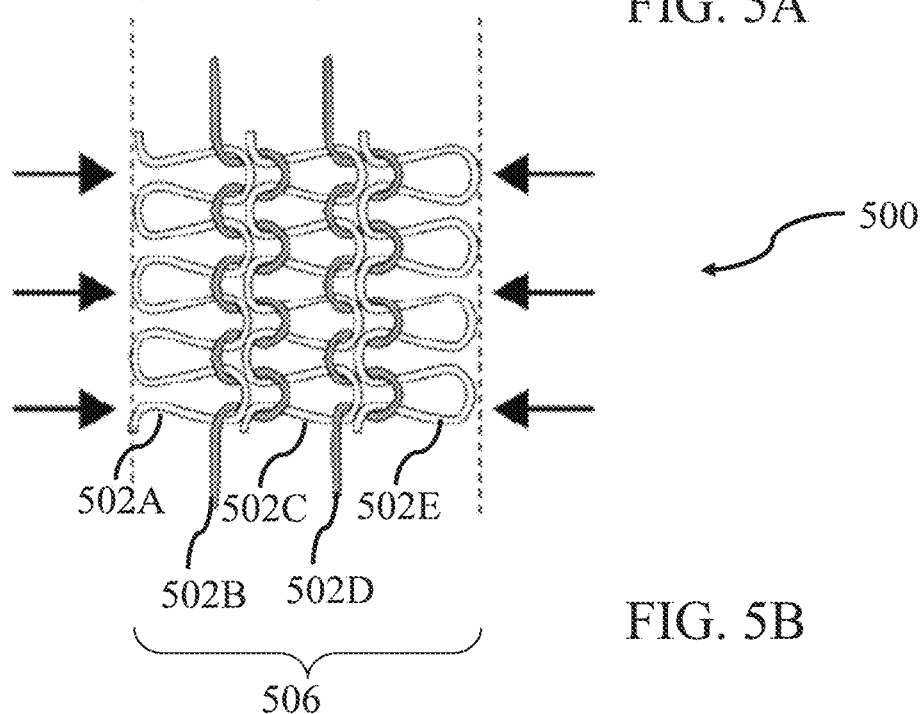

FIGS. 5A and 5B are plan views of fabric 500. Fabric 500, like fabric 400 of FIGS. 4A and 4B, includes five rows (502A, 502B, 502C, 502D, 502E) of knitted material. Fabric 500, unlike fabric 400, includes multiple knitted materials in alternating rows. Shaded rows 502B and 502D are an active yarn material, similar to the material that makes up active rows 402A-402E described above with respect to FIGS. 4A and 4B. In contrast, rows 502A, 502C, and 502E are made of a passive material that does not transition between martensite and austenite states. A passive material can be non-conductive such that electrical heating will not occur in a passive material. For example, the passive material could be a non-conductive polymer. A non-conductive polymer will not draw power when a voltage source is attached to it, therefore use of passive zones in a fabric (e.g., fabric 500) can reduce overall power dissipation per unit area.

Consequently, while in the relaxed state fabric 400 of FIG. 4A looks substantially the same as fabric 500 of FIG. 5A. In contrast, in the activated state fabric 400 (shown in FIG. 4B) compresses by a greater amount than fabric 500 (shown in FIG. 5B, compression indicated by arrows). That is, the proportional difference between width 406 and width 406' is larger than the difference between width 506 and width 506'.

Figure 6A:
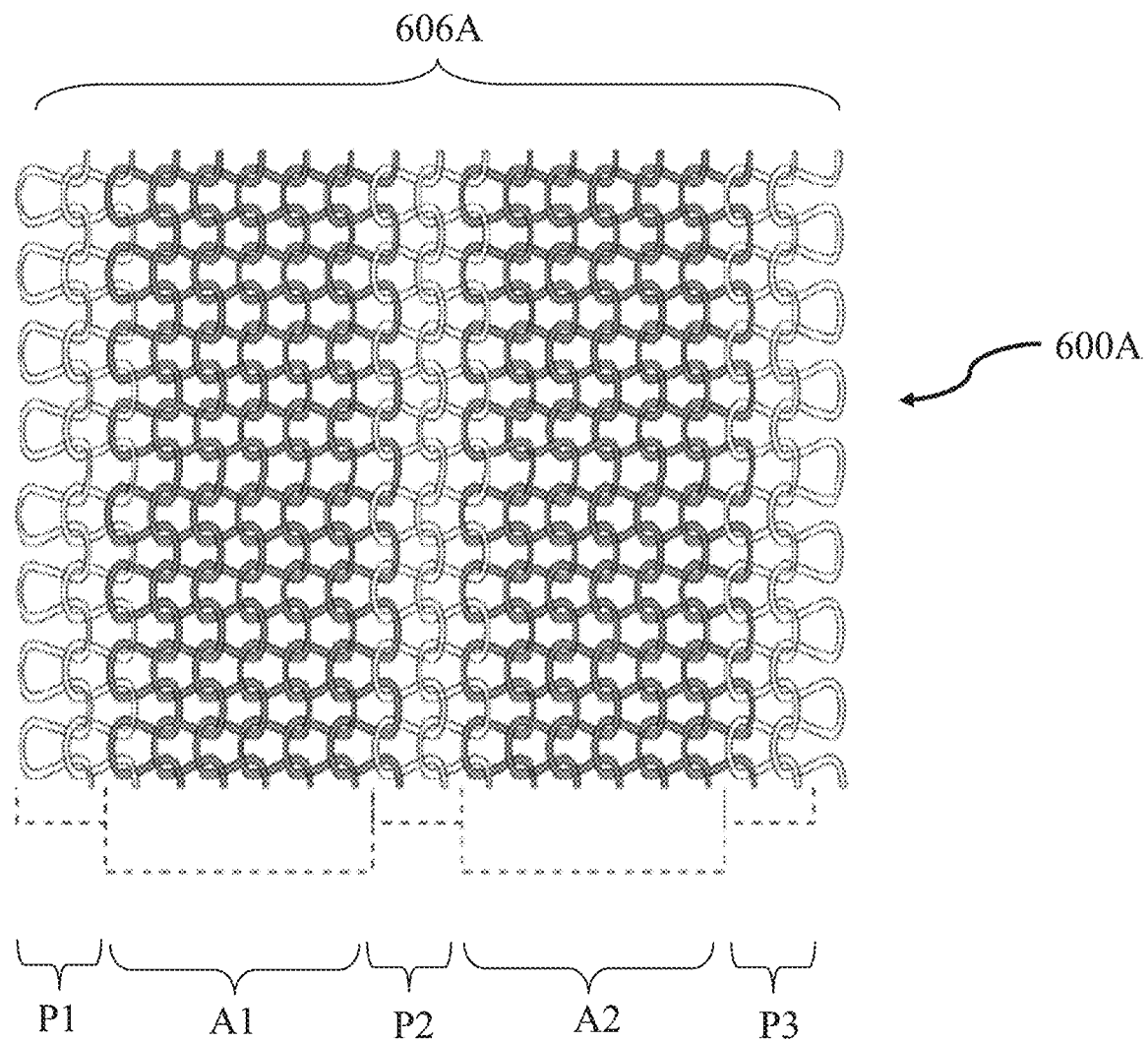
FIGS. 6A-6C are plan views of the active fabric for a therapeutic compression garment with fabric segments having active and passive sections according to three embodiments.
Figure 6B:
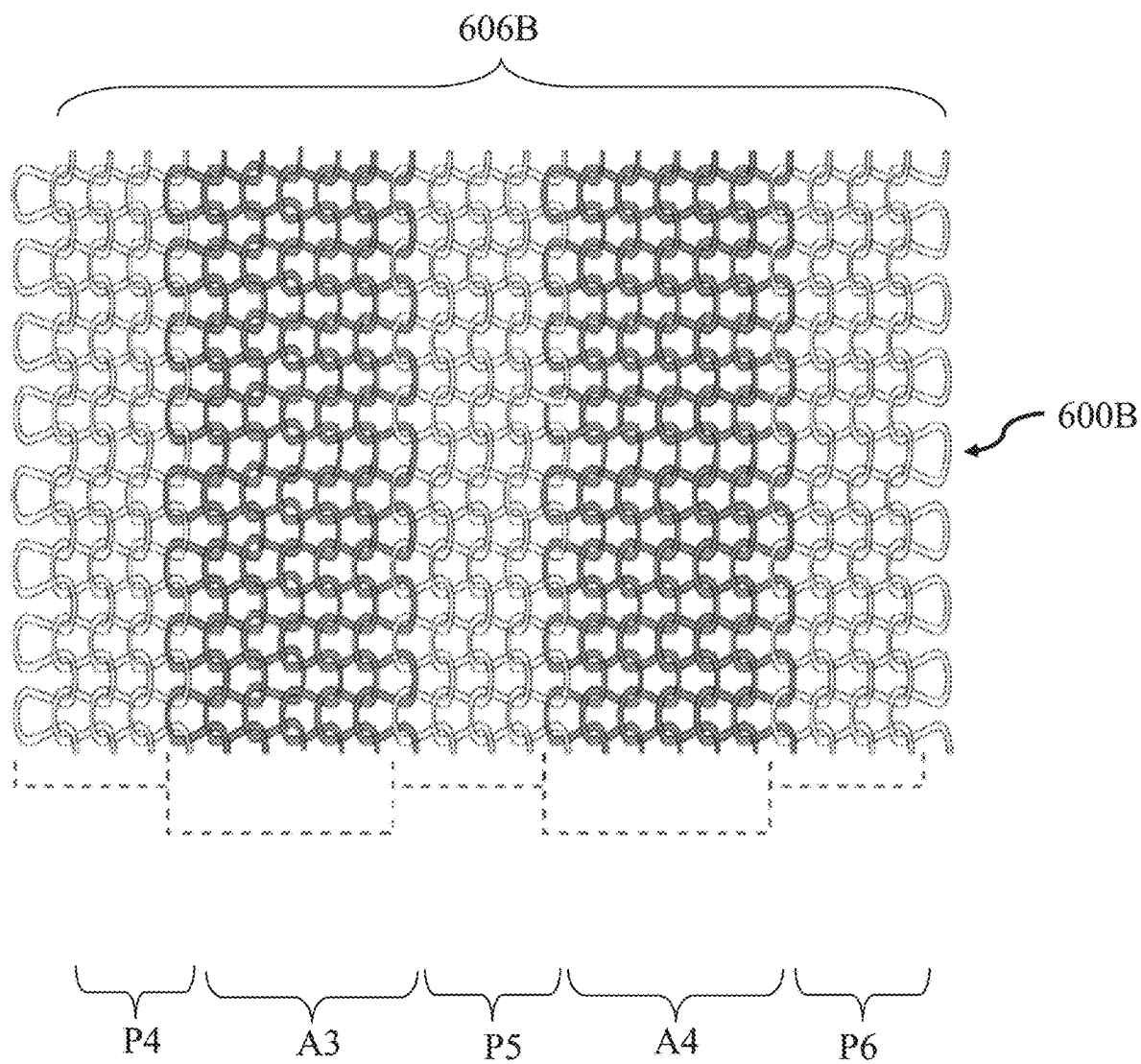
Figure 6C:
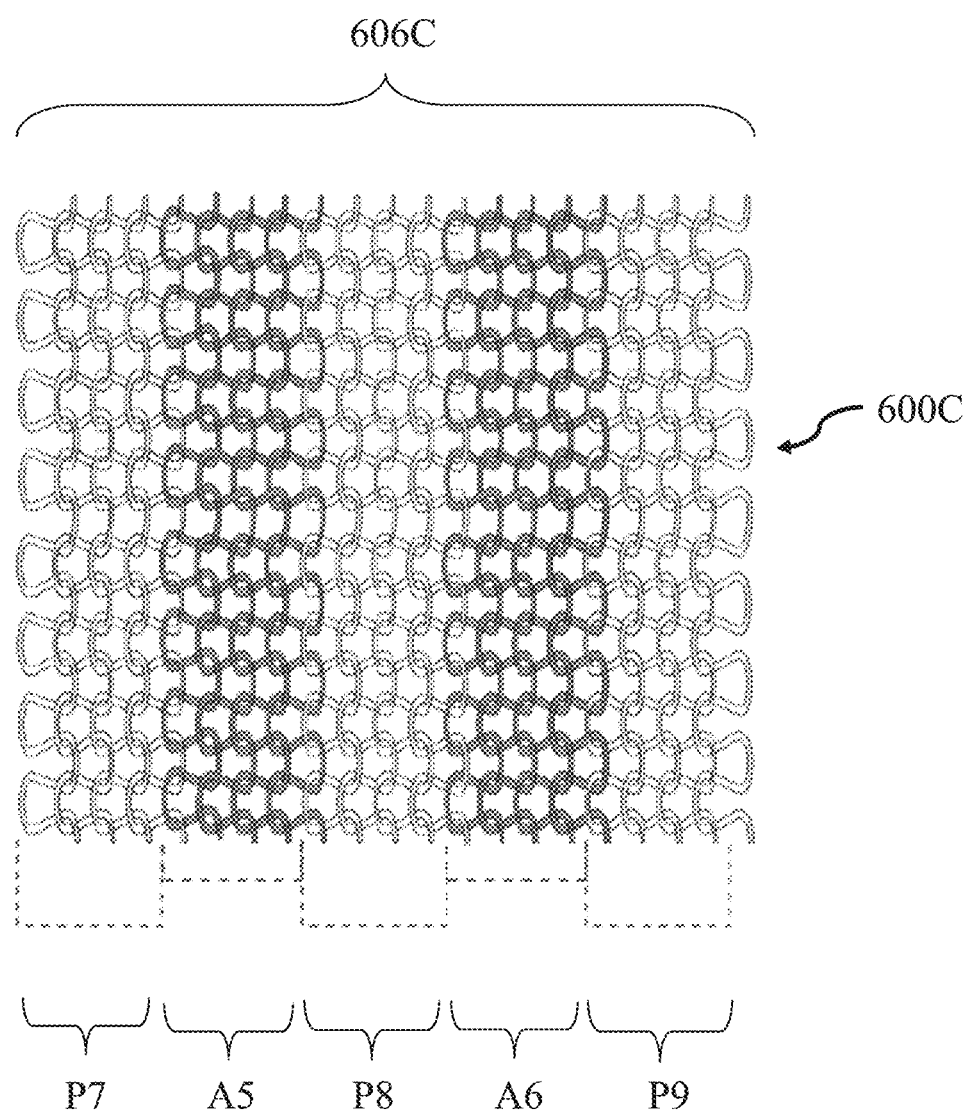

FIGS. 6A, 6B, and 6C are plan views of three weft knitting patterns including active and passive sections.

As shown in FIG. 6A, fabric 600A includes two active sections A1 and A2, as well as three passive sections P1, P2, and P3. Active sections A1 and A2 are each made up of six rows of active knitted material, described above with respect to FIGS. 4A, 4B, 5A, and 5B. Fabric 600 is shown in the relaxed state. By applying heat to active section A1 and/or active section A2, the width 606A of fabric 600A can be reduced.

The maximum possible extent of the reduction in width varies based upon the number of rows of knitted material within each active section (A1, A2) and the number of rows within each passive section (P1, P2, P3), in addition to the factors described above ($i_k$ and d) that affect actuation contraction. Likewise, the maximum possible pressure depends on the applied force $F_{app}$ as described above. For a therapeutic compression garment, the applied force is often relatively high while the total actuation contraction is low, which can be facilitated by the use of passive sections P1-P3 interspersed with active sections A1 and A2 that provide strong contraction over a short distance.

In the embodiment shown in FIG. 6A, each active section A1, A2 includes six rows, whereas each passive section P1, P2, P3 includes two rows of passive material. Therefore 75% of the rows within fabric 600A can be activated to cause compression. In alternative embodiments such as those shown in FIGS. 6B and 6C, where different portions of the fabric are active or passive, the length can remain constant in passive regions while varying due to activation of the active regions as described in the equations above.

Active sections A1 and A2 can be activated independently of one another. For example, in embodiments fabric 600A can be activated by applying an electrical current through active sections A1 and A2 to cause heating. In some cases it may be desirable to activate less than the full 75% of the rows. For example, if it is desirable to activate only 37.5% of the rows, either active section A1 or active section A2 could be activated, leaving the other in the passive state.

FIG. 6B is an alternative embodiment in which fabric 600B includes active sections A3 and A4, as well as passive sections P4, P5, and P6. Like fabric 600A, fabric 600B includes active sections A3 and A4 that each include six rows of an active or shape-memory material. Fabric 600B has relatively wider passive sections P4, P5, and P6 than the counterpart passive sections P1, P2, and P3 of FIG. 6A. In particular, passive sections P4, P5, and P6 each have four rows, in contrast to the 2-row passive sections P1, P2, and P3 of FIG. 6A. The percentage of rows that are active in fabric 600B of FIG. 6B is therefore 60%, compared to 75% that are active in fabric 600A of FIG. 6A.

FIG. 6C is an alternative embodiment in which fabric 600C includes active sections A5 and A6, as well as passive sections P7, P8, and P9. Active sections A5 and A6 each include four rows of an active or shape-memory material, while passive sections P7, P8, and P9 each include four rows of a passive material. The percentage of rows that are active in fabric 500C of FIG. 7C is therefore 50%, compared to 75% that are active in fabric 700A of FIG. 6A or 60% in fabric 600B of FIG. 6B.

FIGS. 7A, 7B, and 7C are front, back, and side perspective views of a therapeutic compression garment 800 according to an embodiment. Therapeutic compression garment 700 includes three sections, 702A, 702B, and 702C. Each of the sections 702A-702C is made up of a different composition of active and passive material. Therefore the level of compression in each section 702A-702C is different, because each section 702A-702C will contract by a different amount when the active sections therein are activated. Compression levels can be targeted to areas where it desirable to apply relatively higher or lower amounts of compression. The different compositions in each section can be, for example, different knit tightness or pattern (affecting $i_k$), different diameter of knit material (affecting d), different ratios of active to passive materials, or the use of different materials that have different shape memory characteristics such as transition temperature, transition displacement, or transition force.

FIG. 7B shows connector 704. In embodiments, connector 704 can be a zipper, a pair of hook-and-loop connectors, snaps, buttons, or other fasteners to couple the edge of garment 700 to another edge or portion of garment 700 to form a closed loop or sleeve. In alternative embodiments, connector 704 may not be required. Depending on the size of the loops that make up each of the active and passive rows, as well as the thickness of the material, some embodiments of garment 700 are loose enough to be donned without a connector. Such embodiments can be permanently sewn together, or other techniques such as knitting-in-the-round can be used to create those embodiments.

In alternate embodiments, the sections 702A-702C can have equal percentages of active and passive material, but the sections 702A-702C can be operated differently. For example, half of the active sections of one zone may be activated, while three quarters of the active zones of another zone are activated, and all of the active zones of the third zone are activated. Compression gradients can be created in this way without customizing the knitting pattern of the garment.

In alternate embodiments, zones need not be circular and extend longitudinally. Instead, zones could be arranged at different azimuthal positions within a cylindrical section, or zones could be any other irregular shape that can be knitted into the overall fabric. Active sections can be concentrated in areas where compression is desired, as higher concentrations of active regions can be used to focus the compression to those areas.

Figure 7D:
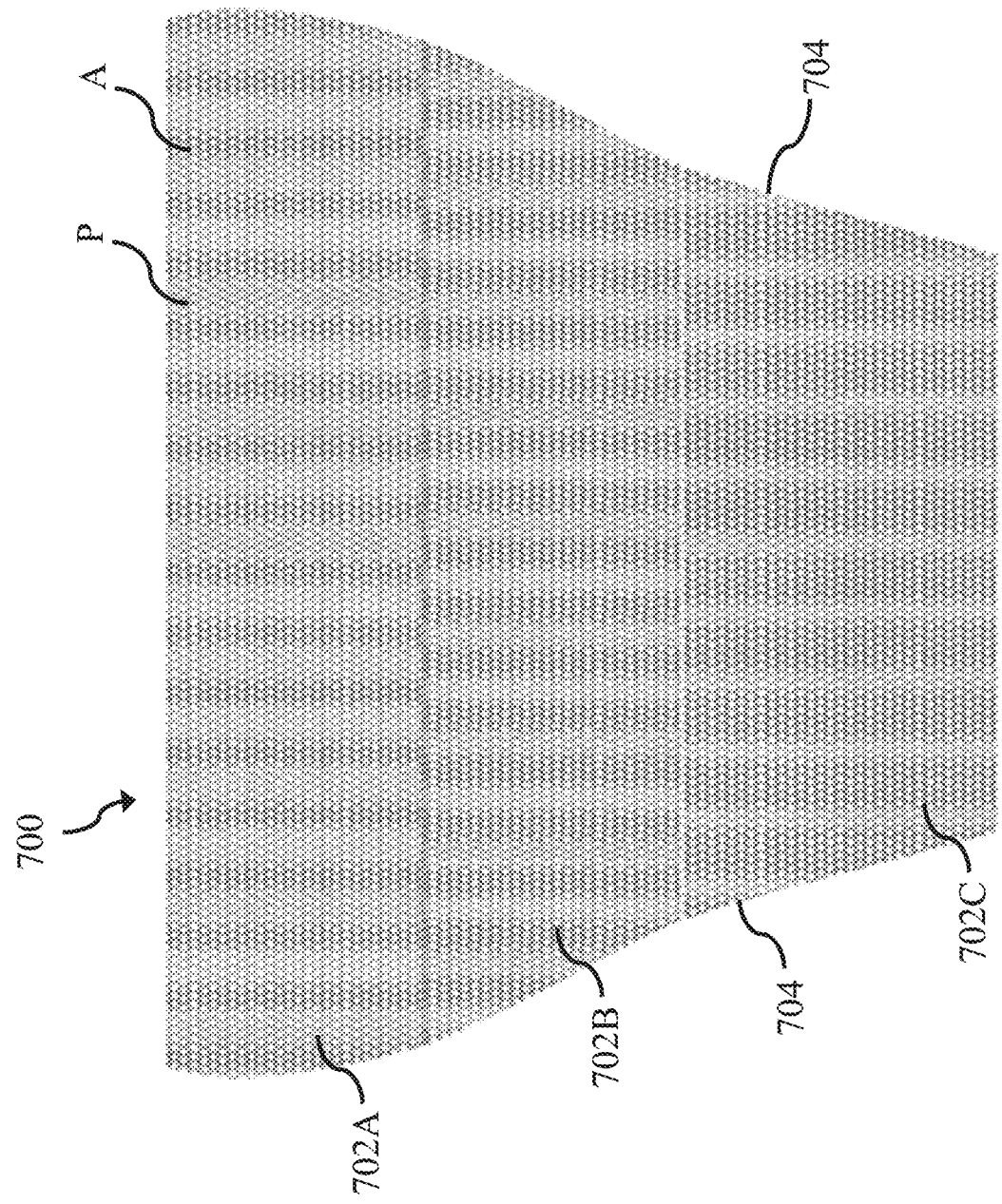
FIG. 7D is a plan view of the active garment of FIGS. 7A-7C.

FIG. 7D is a plan view of garment 700, laid out flat with connector 704 disconnected. As shown in FIG. 7D, zone 702A has a relatively high percentage of passive sections P (shown in light color), zone 702B has a slightly lower percentage of passive sections P, and zone 702C has the lowest percentage of passive sections P (and, correspondingly, the highest percentage of active sections A).

Other garments can be configured to adapt compression levels based on the body's dynamic shape change. For example, a garment with an active material architecture can be designed to dynamically expand in circumference from 1 to 6% at the calf and from 1 to 8% at the ankle when the wearer transitions from a standing to a seating posture to accommodate anthropometric changes and maintain a target pressure output. A garment for use on a knee region can take into account increasing radii to prevent tourniquetting of blood into the feet and calves. An active architecture can expand up to 7% at the knee when sitting, in an embodiment, up to 12% in other embodiments, or up to 13% in alternative embodiments. For thigh compression, the active material architecture can expand or contract from a target standing circumference. To accommodate the anthropometric requirement of the thigh, an active material designed for the thigh region can have a greater circumferential stroke change than other regions of the leg. Like the knee, the thigh region requires the design of several different active architectures according to weight category. In some embodiments, the total amount of compression can correspond to a circumferential change up to 14% in some embodiments, up to 15% in other embodiments, up to 16% in still further embodiments, and up to 17% in still further embodiments. In other embodiments, tourniquetting of the blood can be desirable, and therefore the amount of compression applied to a particular region may exceed the amount that permits normal blood flow.

Active materials can be selected that have transition temperatures near the ambient temperature of areas where they will be used. For example, compression garments could have active zones knitted from an active material that has a transition temperature slightly higher than skin temperature. Very little additional energy is then required to cause the material to change to the activated state, and no energy is required to cool the active material back below its activation temperature. Transition between states can also be rapid as the total amount of temperature change required to transfer between the states is small.

In embodiments, the level of compression provided by a garment or even a particular zone within a garment can vary over time. For example, power can be supplied to active materials to cause heating and activation, then power can be stopped and the material allowed to cool, at a desired frequency. Entire zones can be pulsed in this way, and pulsing of different zones can be coordinated. Coordination of pulsed pressure application can be used, for example, to promote lymph flow or blood circulation. In embodiments, sensors can be used to detect attributes of the patient. For example, sensors can detect a pulse rate of a patient, and pulsing of the power supply can correspond to that pulse rate in order to promote circulation. A control system, either with or without sensors, can be used to set the pulse rate, compression amount, or other aspects of the garment.

In embodiments where more rapid pulsing is required, or where the activation temperature of the active material is close to the ambient conditions where that garment will be used, active cooling can be employed to more rapidly convert the material back to its relaxed state. For example, a sleeve can surround the active material in a garment, and the sleeve can act either as a heat sink or can be actively chilled.

Other sleeves and liners that promote comfort or ease of use of the garment can be used. In one embodiment, an inner sleeve of a smooth material is attached to the active and passive material zones. The inner sleeve acts as a barrier to prevent contact of the fabric (e.g., fabric 400, 500) with the user. Inner and outer sleeves or liners can include medicaments or other substances, in embodiments.

Figure 8:
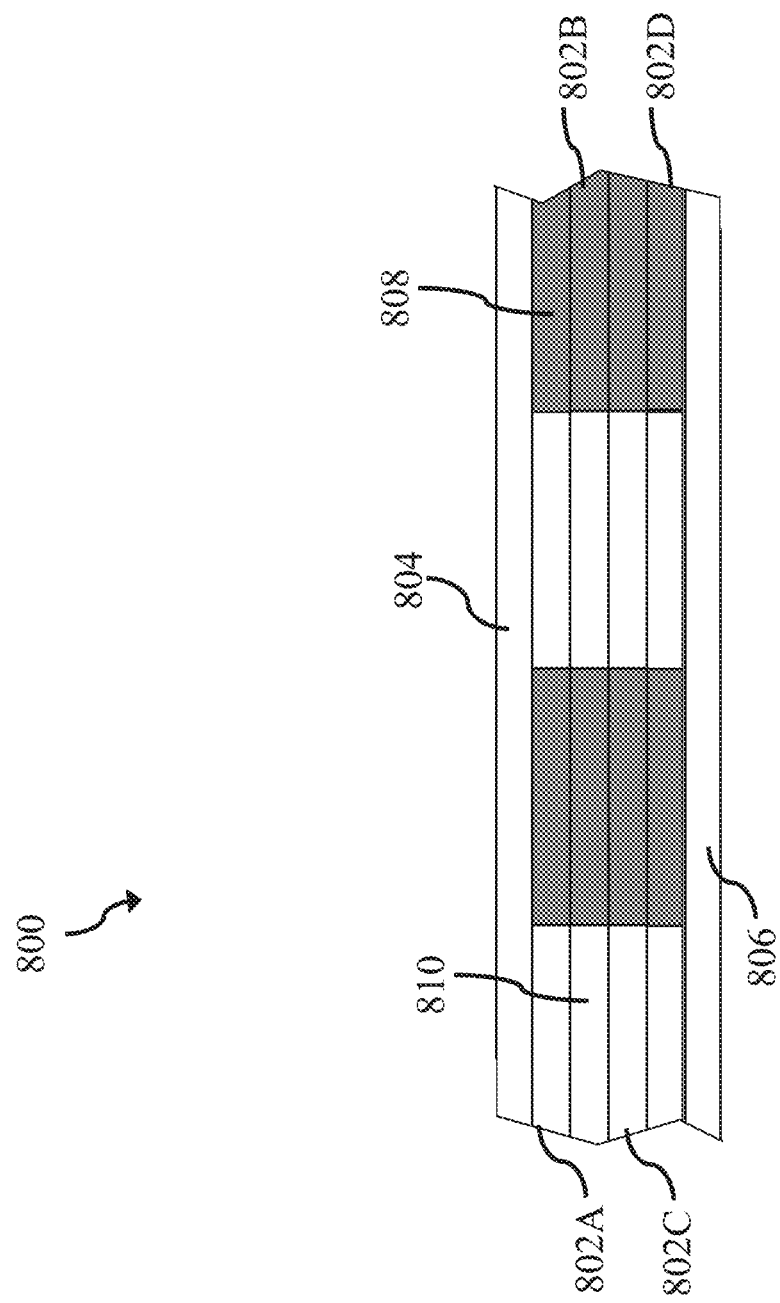
FIG. 8 is a cross-sectional view of a portion of a multi-layer therapeutic active compression garment according to an embodiment.

As shown in FIG. 8, a multi-layer garment 800 can include four separate compression layers 802A, 802B, 802C, and 802D, arranged between a top liner 804 and a bottom liner 806. Each compression layer 802A-802D is made up of active material 808 and passive material 810. Active material 808 and passive material 810 can be knitted together as described above. Multiple layers 802A-802D can be used to generate more compressive force than a single layer, which can be beneficial depending upon the compressive strength of the active material 808 and the amount of compression desired.

Figure 9:
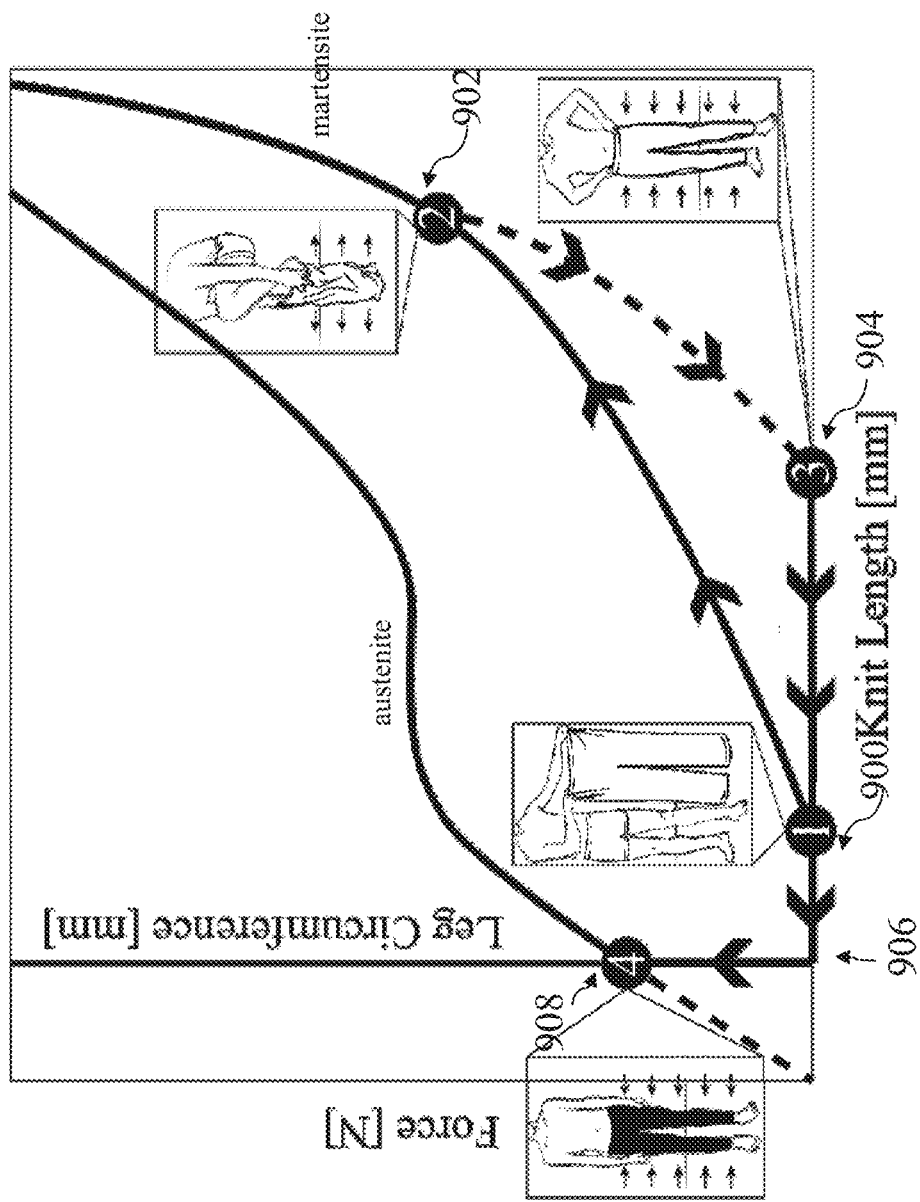
FIG. 9 is a force-length diagram for a self-fitting active shape memory garment according to an embodiment.

In embodiments, top liner 804 can be connected to the closest compression layer 802A. The connection can be either continuous (i.e., interwoven), or in embodiments top liner 804 can be loosely connected to compression layer 802A. Likewise, bottom liner 806 can be either tightly or loosely coupled to compression layer 802D. In alternative embodiments, active regions 808 or each layer (802A, 802B, 802C, 802D) need not align with one another in regular columns as shown in FIG. 9. Rather, the active regions 808 could be staggered, or could be sized and positioned differently between each of the layers (802A, 802B, 802C, 802D).

Self-Fitting Garments

FIGS. 9-15B relate to self-fitting garments.

Self-fitting garments rely on the same underlying principles of transition from martensite to austenite and back that are described above with respect to therapeutic compression garments. In self-fitting garments, however, the goal is to have the garment shrink to size for a wearer, without applying any constrictive force.

As described above, in knitted active materials a relevant parameter that affects the overall compression provided by a knitted segment is defined by the ratio of the loop area enclosed in the martensite state ($A_{l,m}$) and the square of the active knit material wire diameter d:

$$i_k = A_{l,m}/d^2.$$

It should be understood that in embodiments it may be desirable to use a thread or yarn of active materials, or a twisted pair or trio of wires, or any of a variety of braids, for example, and the equations herein apply to the idealized case. Each alternative configuration will have different compression characteristics, which are not described in detail within this disclosure.

In the idealized case of knit material with circular cross sections, the knit index $i_k$ is an intuitive and easily obtainable parameter describing the dimensionality of contractile SMA knitted actuators. A low knit index corresponds to densely knitted fabrics, with a relatively high proportion of active material in a unit area.

FIG. 9 is similar to FIG. 3 in that it shows force and length for an active fabric. Unlike FIG. 3, though, FIG. 9 depicts the change in length and force for a self-fitting garment. In general, as described above, self-fitting garments aim to provide more displacement and less force, to provide a garment that begins with substantial "ease" and shrinks to little or no "ease" (i.e., little or no difference in circumference of the garment compared to the circumference of the body part it covers). This is different from a compression garment which must begin stretched, or fitted to the body initially to translate maximum compressive forces to the body.

Two garments having identical knit indices can achieve different compressive forces on the body depending upon the austenite and martensite curves. The force applied by the fabric will be based upon the contraction of the circumference of the garment, which is in turn dependent upon the knit index of the material and upon the wire diameter. The force applied is also dependent upon the leg circumference in FIG. 9 (or, in other embodiments, upon the circumference of any other loop of fabric). Knit index generally correlates to a level of contraction, while wire diameter correlates to a level of force.

At 900, an oversized, martensite garment is provided. As the garment is donned at 902, some force is applied to stretch the garment. Once donned, the martensite garment relaxes on the body, such that no force is applied as shown at 904. As the garment is heated it transitions to austenite, causing contraction of the fabric. At first, this contraction does not cause any force to be applied, until the garment reaches the same circumference as the body part it covers at 906. Thereafter, if the garment may continue to apply some force as shown at 908.

Figures 10A, 10B, 10C:
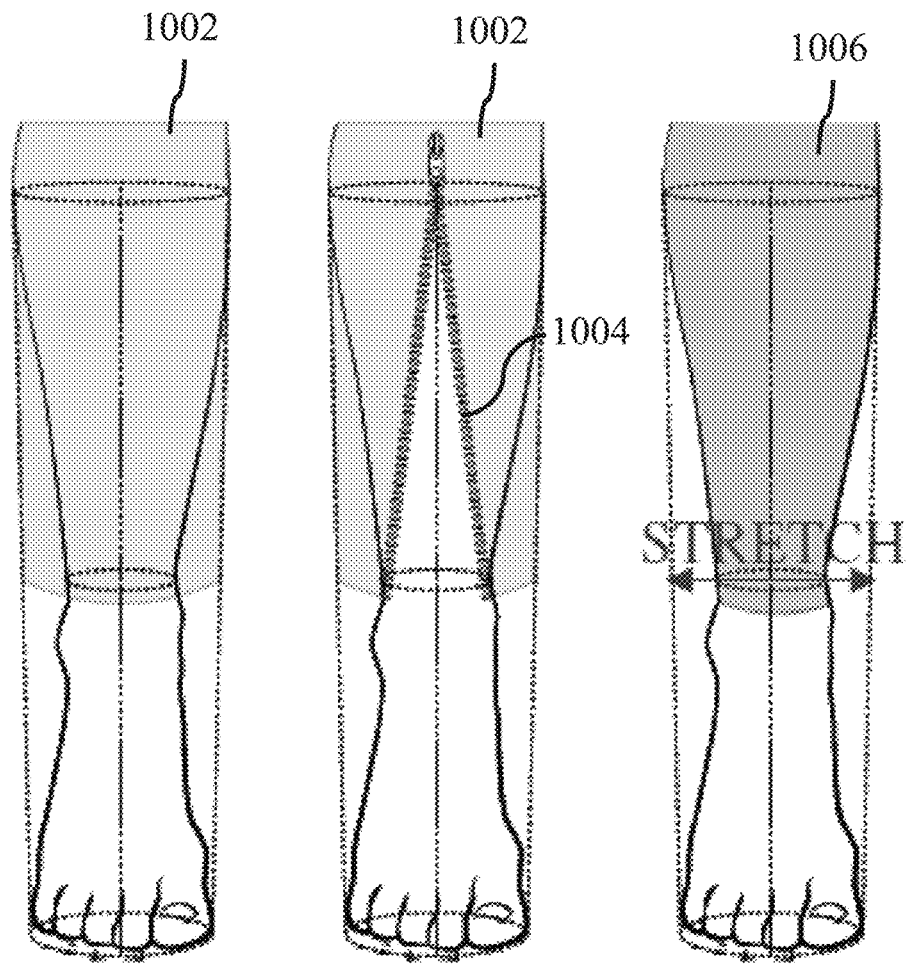
FIGS. 10A-10C depict three styles of garments having positive ease, zero ease, and negative ease, respectively.

FIGS. 10A-10C depict three styles of garments that show the benefit of a self-fitting garment. An inelastic fabric garment such as garment 1002 shown in FIG. 10A is loose fitting, and leaves room between the leg and the garment 1002. An inelastic fabric garment 1004 of FIG. 10B can be made to be form fitting, but in order to be donned a fastener 1004 (here, a zipper) is required. In order to avoid the use of fastener 1004, a stretch fabric is used in garment 1006 to constrict the garment. For most wearers, the inelastic garment 1002 is the easiest to don or doff. Meanwhile, 1004 is the most appropriately sized for wearing, as it is neither constrictive nor baggy, but it suffers from the requirement of fasteners as it is made of an inelastic fabric. Forgoing the inelastic fabric of FIG. 10B and instead relying on elastic constriction of the elastic garment 1006 of FIG. 10C creates its own issues, such as overly constrictive garments and difficulty donning and doffing the garment 1006 as compared to an inelastic fabric such as those used in garments 1002 and 1004.

The required fit for various garments varies. For example, oversized t-shirts designed in three sizes may fit a larger portion of the population than a fitted dress shirt in six sizes due to the amount of garment ease that is aesthetically desired in that garment. In most garments that are not used for therapeutic compression, the most desirable and comfortable ready-to-wear consumer clothing has positive ease. Tight-fitting, stiff garment are not comfortable, but necessary for specialized functionality.

Figure 11A:
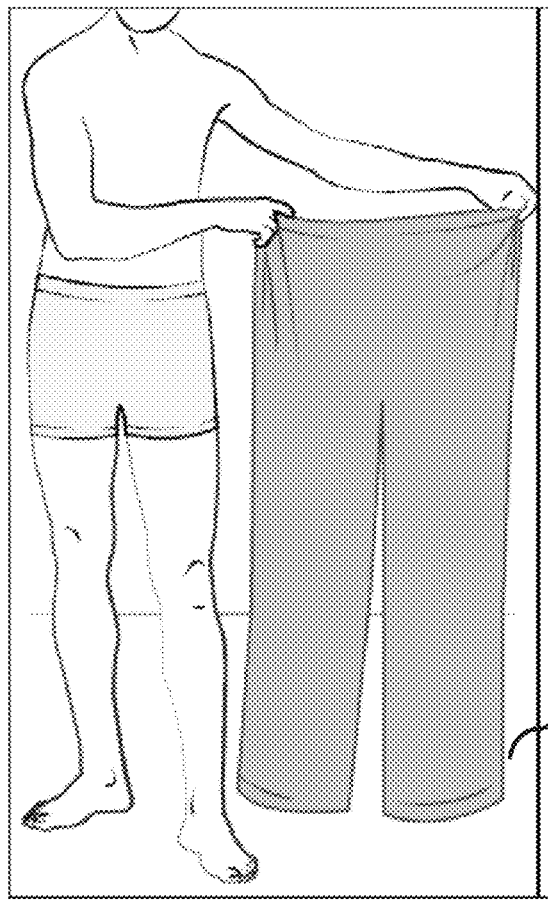
FIGS. 11A-11D depict an active self-fitting garment that transitions from positive ease to approximately zero ease without the use of fasteners or applied power, according to an embodiment.
Figure 11B:
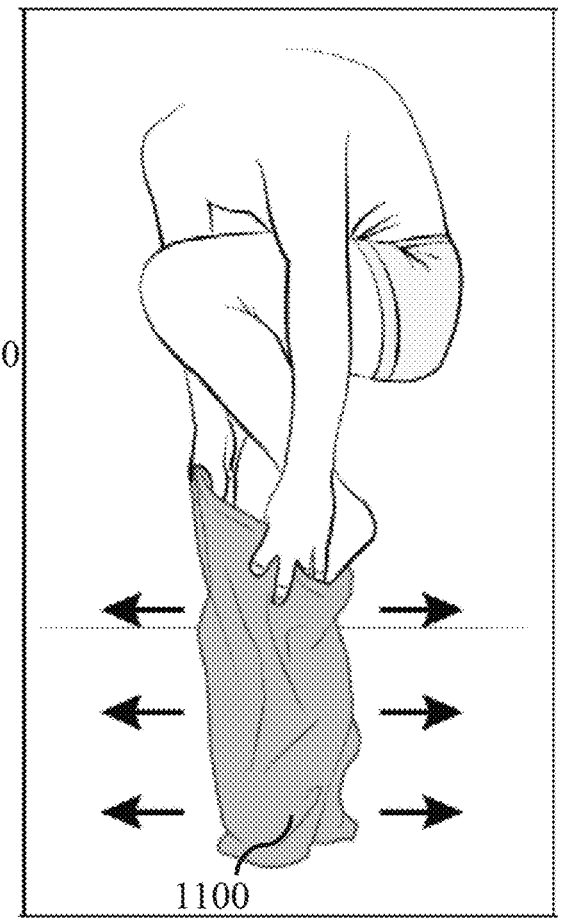
Figure 11C:
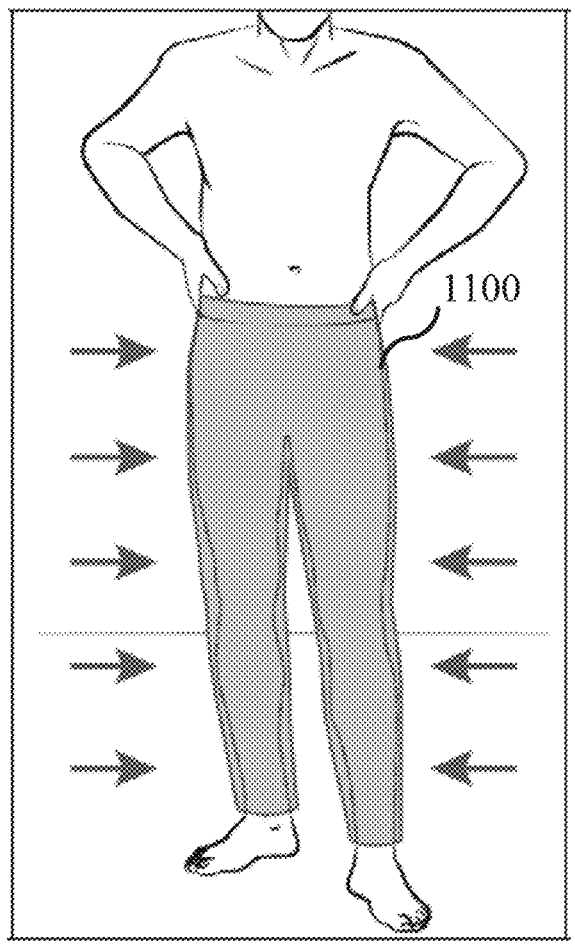
Figure 11D:
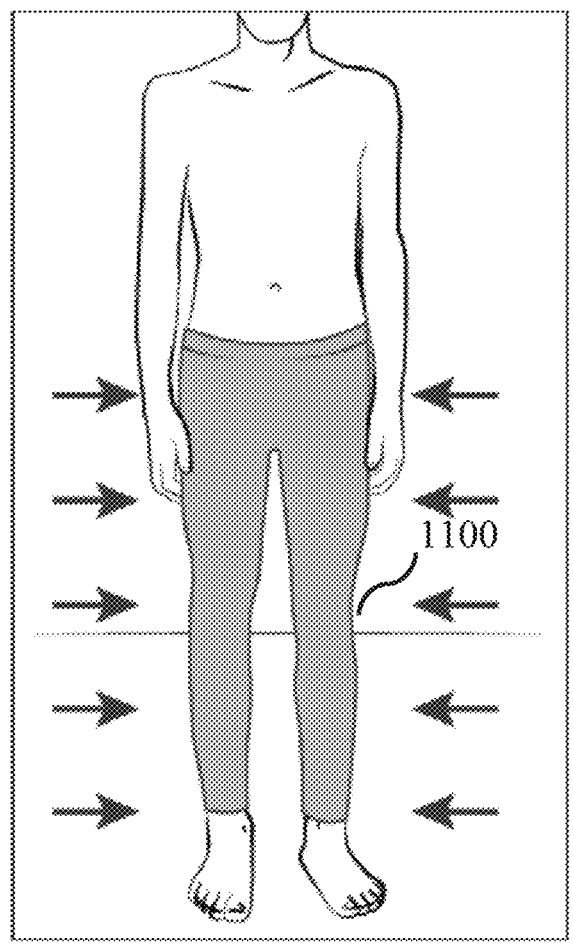
Figure 12:
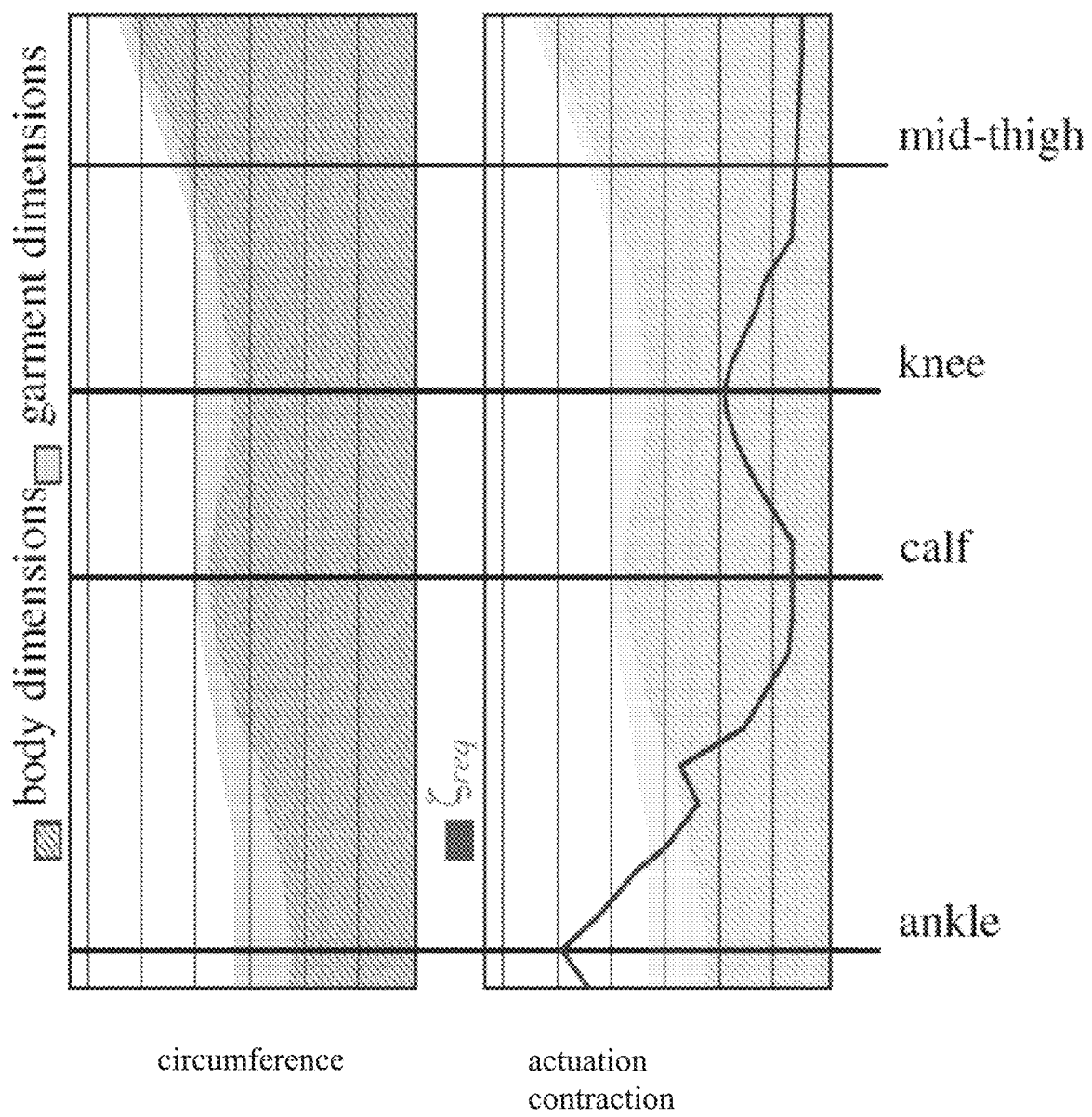
FIG. 12 depicts the required actuation contraction for a self-fitting garment according to an embodiment.

FIGS. 11A-11D depict a self-fitting garment that achieves approximately zero ease without the use of fasteners, according to an embodiment. As shown in FIG. 11A, the proposed garment 1100 is compliant and oversized before don (i.e., at stage 900 of FIG. 9). During the donning process, as shown in FIG. 11B the oversized, compliant garment 1100 is stretched out further as it is pulled over the limbs (i.e., at stage 902 of FIG. 9). Once on the body and free of external forces, the garment slightly relaxes around its new form as shown in FIG. 11C (i.e., at stage 904 of FIG. 9). The garment then warms to skin temperature, which causes the shape memory alloy materials that are knitted into garment 1100 to contract and stiffen as shown in FIG. 11D (i.e., to stage 906 and then 908 of FIG. 9). The result is a stiff, fitted garment with zero or near-zero ease. To doff, the garment would either need to be cooled, mechanically forced, or designed with release mechanisms.

Although garment 1100 is shown as a pair of pants, other garments can be made that will conform similarly. For each type of garment, a self-fitting garment can be designed by mapping the body-garment relationship. Contractile SMA knitted actuators exhibit tunable functional performance through the systematic modification of geometric design parameters, specifically wire diameter d and knit index $i_k$, as described above. Before determining suitable knit geometries to achieve self-fit, the body-garment relationship can be mapped. Mapping can be accomplished by gathering dimensional data from a sample group. Marks can be placed on the participants' body and at each incremental mark, a circumferential measurement is taken.

Once circumferential measurements have been gathered, the performance requirements of the self-fitting garment can be compared with the measurements to design a garment. For an inextensible garment such as garment 1100, the minimum garment dimension required at the base of a pant leg to enable don/doff (i.e., traverse the foot) was determined to be the calf dimension plus 2.5 cm of positive ease. This recommended added garment dimension means that the garment circumference around the ankle should be equal to the garment dimension around the calf. Additionally, the garment 1100 dimension around the knee must be equal to the garment dimensions around the calf to enable the garment to traverse the calf. The required functional performance of the self-fitting garment is consequently defined as the percentage difference between the garment dimensions and the body dimensions. The circumference of the body and the garment are shown in the left-hand side of the graph in FIG. 12. Based on the initial and desired contracted circumference at each portion on the body (i.e., the initial length and contracted length of each circumferentially-extending shape memory coil), the required contraction $\xi_{req}$ can be determined.

Figure 13:
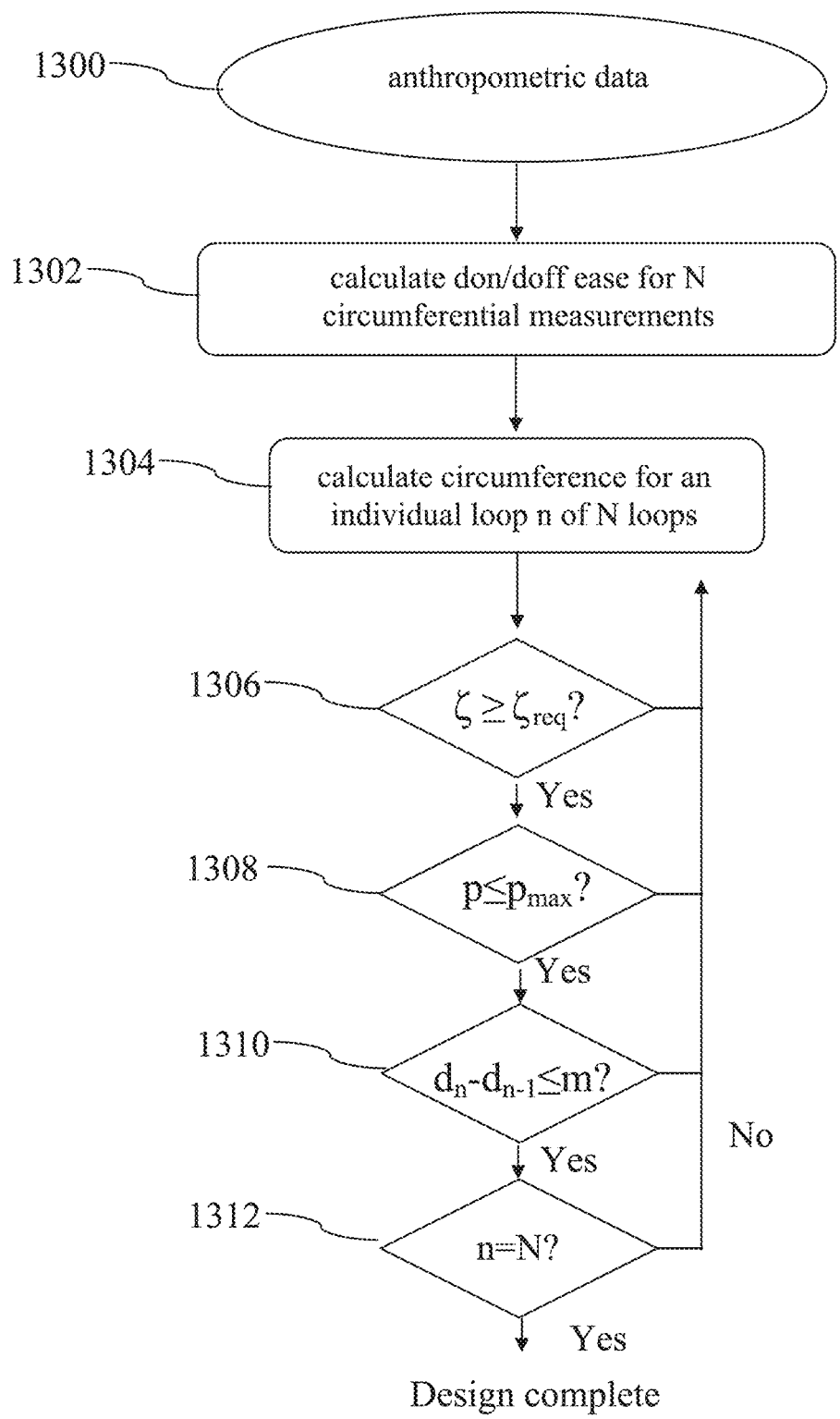
FIG. 13 illustrates a flowchart of a method for providing a self-fitting garment according to an embodiment.

For garments that are designed primary for comfort and aesthetics (i.e., where desired compression is near zero rather than a positive value), actuation contraction $\xi_{req}$ should ordinarily be maximized while the force applied $F_{app}$ should be minimized, while still maintaining desired contraction under forces that are to be expected during wear. FIG. 13 shows a martensite-austenite transition loop corresponding to an embodiment. Upon donning the fully-martensitic garment at (1), small forces are exerted on the garment, which cause further garment dimensional expansion at (2). Upon release, the garment contracts into its martensite relaxed state and recovers some of the extension from the donning process (3). Heating (body or external source) causes the garment circumference to decrease to approximate the leg circumference at (4). Additional contractile ability of the garment results in a generation of forces and pressure on the leg, which are to be minimized in the design through garment sizing and anthropometric analysis.

FIG. 13 illustrates a flowchart of a method according to an embodiment. At 1300, anthropometric data is provided, such as from a database or from independent measurements of a body part for which a garment is being created. At 1302, the anthropometric data is used to calculate donning and doffing ease requirements for N different body cross sections or circumferential measurements, as described above with respect to FIG. 12. At 1304, the ideal garment circumference for each of these N circumferential body cross-sections is determined. At 1306, for each body cross-sections n of the N total body cross-sections, an actuation contraction is determined to regain the original body dimensions. If the actuation contraction is too large (i.e., greater than the required actuation contraction $\xi_{req}$), then the circumference for that knitted garment cross-section is recalculated (i.e. number of knit courses is added or subtracted) or another knitted architecture is selected. Otherwise, the pressure applied by that knitted architecture at a certain length (i.e. number of knitted courses) is calculated at 1308. The pressure applied by a knitted cross-section n is directly related to the force applied $F_{app}$. If the force is too great (e.g., more than 1333 Pa in some embodiments, or greater than 1000 Pa in other embodiments), then the circumference for that knitted cross-section is recalculated (i.e. number of knit courses is added or subtracted). Otherwise, the difference between the diameter of the wire used in knitted cross-section n and the diameter of the wire used in preceding knitted cross-section n−1 is determined. If that difference is greater than a threshold (e.g., 0.1 mm) then another knitted architecture is selected. Otherwise, the knitted architecture and the number of courses that make up that knitted cross-section n is finalized and the process is iterated through the remainder of the N cross-sections at 1312. Once all of the cross-sections from 1 to N are calculated, the design is complete.

FIGS. 14 and 15 show test data for a series of fabrics made with different knit indices and diameters.

Figure 14A:
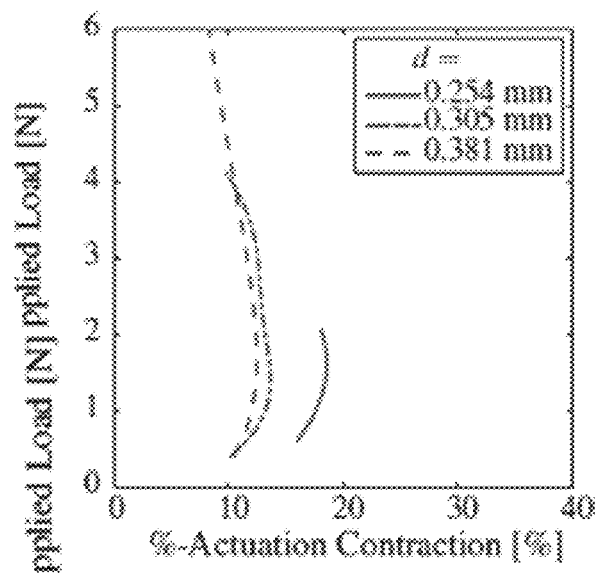
FIGS. 14A and 14B depict load, actuation contraction, and mechanical work in contractile shape memory alloy knitted actuators with a common knit index.
Figure 14B:
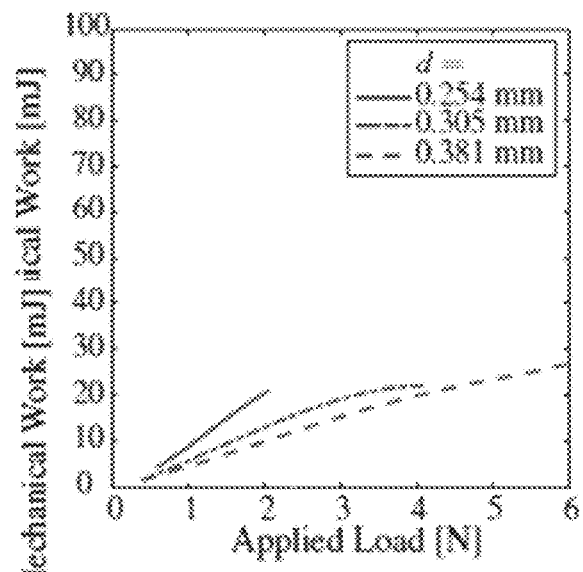

FIG. 14A shows applied load vs. actuation contraction of contractile shape memory alloy knitted actuators, all of which have a knit index of 65, but which have varying filament diameters. FIG. 14B shows mechanical work as a function of applied load for the same loops as FIG. 14A.

Figure 14C:
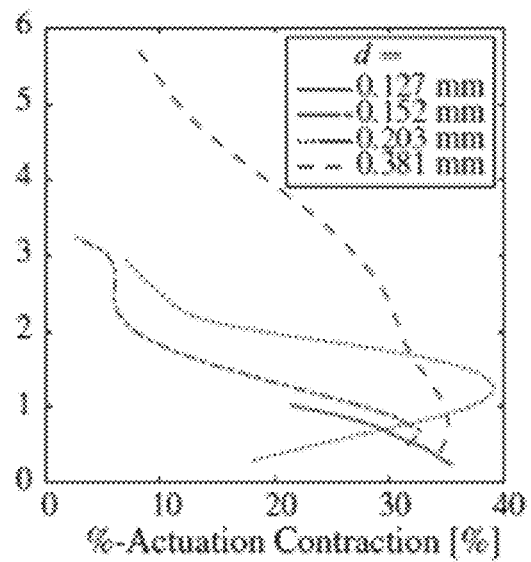
FIGS. 14C and 14D depict load, actuation contraction, and mechanical work in contractile shape memory alloy knitted actuators with a second common knit index.
Figure 14D:
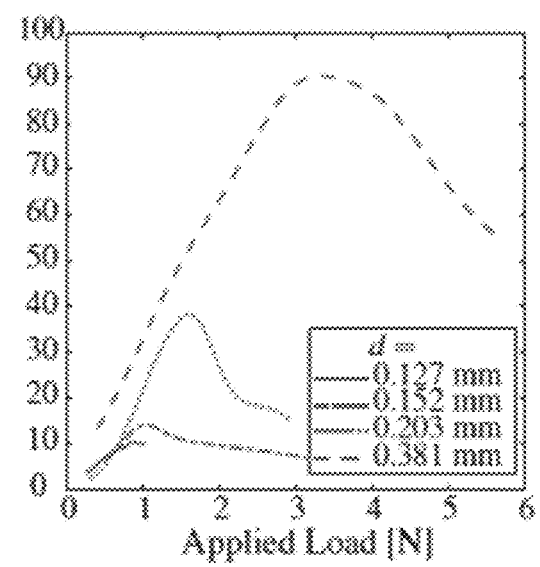

FIG. 14C shows applied load vs. actuation contraction of contractile shape memory alloy knitted actuators, all of which have a knit index of 130, but which have varying diameters. FIG. 14D shows mechanical work as a function of applied load for the same loops as FIG. 14C.

Figure 15A:
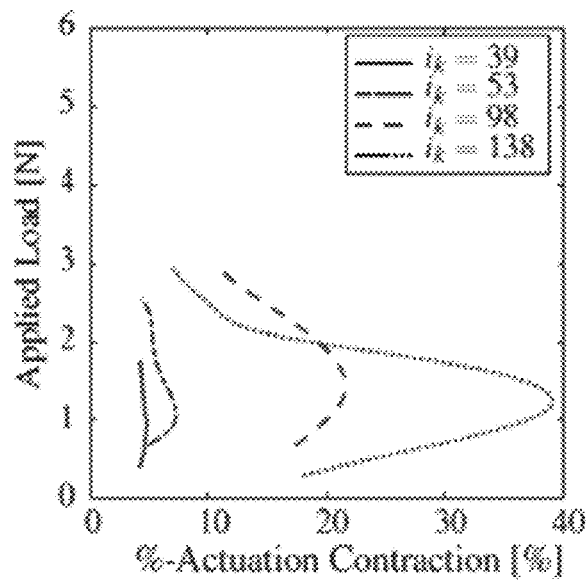
FIGS. 15A and 15B depict load, actuation contraction, and mechanical work in contractile shape memory alloy knitted actuators with a common diameter and varying knit indices.
Figure 15B:
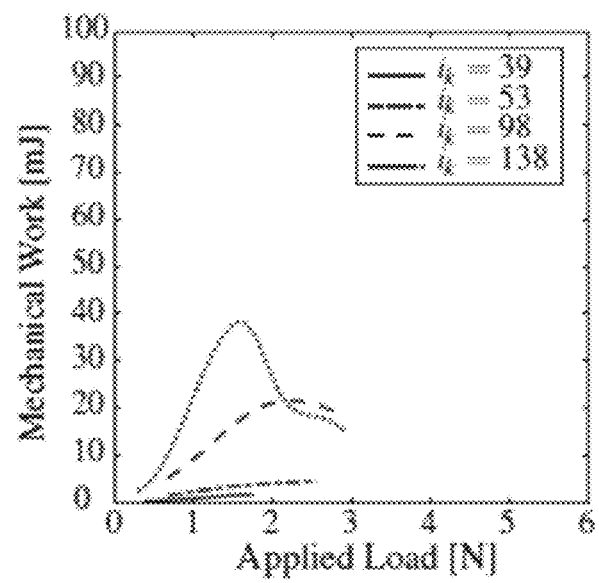

FIGS. 15A and 15B show applied load as a function of actuation contraction, and mechanical work as a function of applied load, respectively. Each of the lines depicted in FIGS. 15A and 15B corresponds to contractile shape memory alloy knitted actuators having a diameter of 0.203 mm and varying knit indices between about 39 to about 138. As shown in FIGS. 14A-14D and 15A-15B, a maximum actuation contraction point can be determined for each knit index and diameter. The maximum actuation contraction is a very useful and widely used metric for the analysis of the actuation performance of uniaxial actuators. The applied load over actuation contraction profiles of contractile SMA knitted actuators share the characteristic shape with a deflection point at the maximum actuation contraction. Under loading conditions below the maximum actuation contraction, the behavior of the knitted actuator is dominated by the variable stiffness upon phase transformation, which leverages the geometry to achieve constantly increasing actuation contractions. At applied loads larger than the force at maximum actuation contraction, the knitted architecture loses the ability to recover the deformations, which results in decreased actuation contractions. The maximum actuation contraction is obtained by determining the global maxima of $(I_M-I_A)/I_M$, as described above.

Segmentation and Pressure Relief

Figure 16:
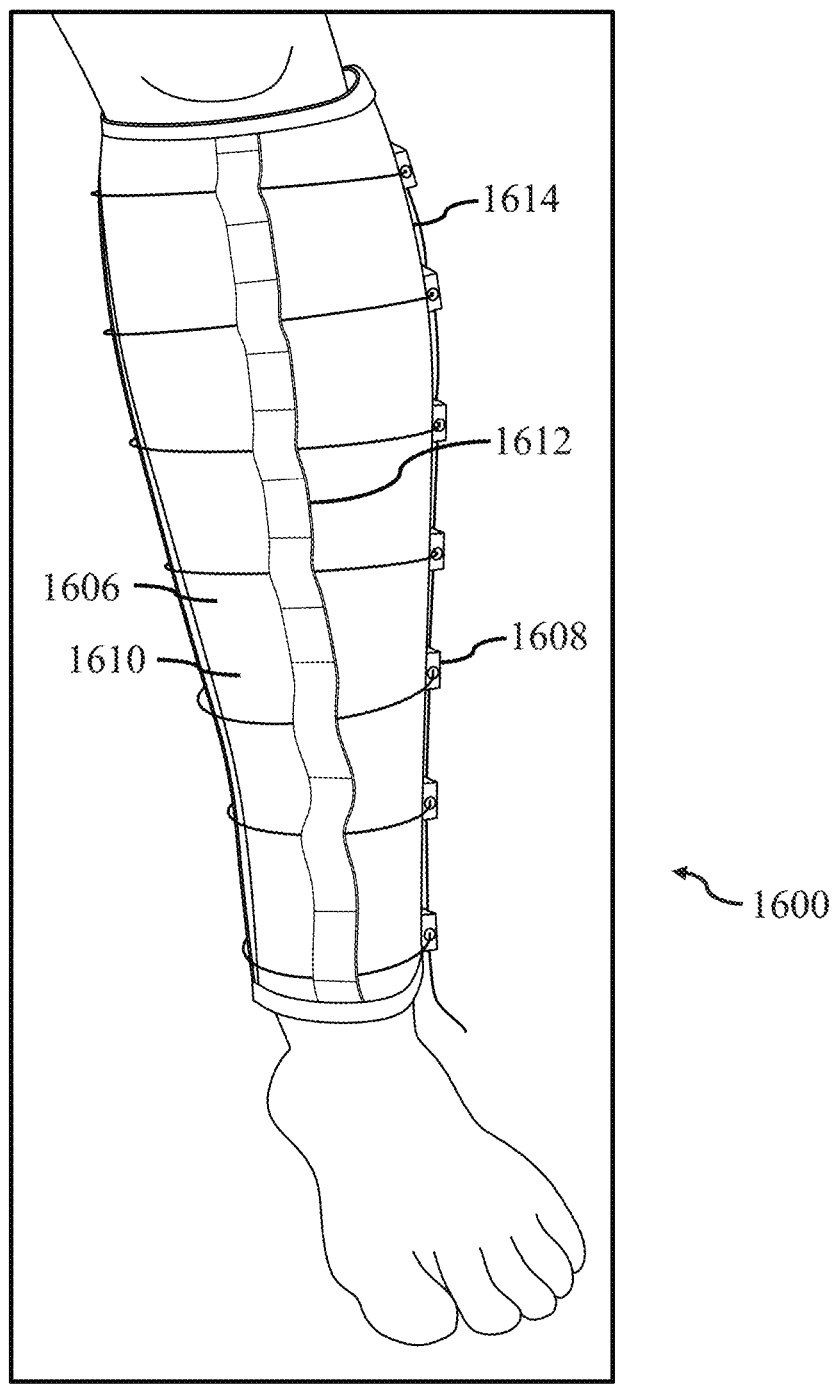
FIG. 16 is a perspective view of an inner layer of an active compression garment according to an embodiment.

FIG. 16 is a cutaway view of a compression garment 1600, which could be implemented within the outer layer depicted in FIG. 1B as described above. As mentioned with respect to FIG. 1B, the outer layer has been removed in FIG. 16 to expose inner active and passive components. The components of a compression garment 1600 that are visible in FIG. 16 would normally be arranged within the outer layer. In particular, FIG. 16 shows inner layer 1606, a plurality of switches 1608, shape-memory segments 1610, and tape 1612. In other embodiments, more or fewer switches 1608 and shape-memory segments 1610 than are depicted in FIG. 16 can be included in compression garment 1600.

Inner layer 1606, like outer layer 102B described above with respect to FIG. 1B, is a passive layer in the embodiment shown in FIG. 16. Inner layer 1606 can be made of a fabric or other passive material. In embodiments, inner layer 1606 can be compressible to undergo radial contraction without folding or wrinkling. Furthermore, in embodiments inner layer 1606 can be made from pressure-spreading materials or include embedded elements for dispersing pressure that results from constriction by contraction of shape memory segments 1610.

In contrast with inner layer 1606, switches 1608 and shape memory segments 1610 form an active compression system. Switches 1608 provide a constant tension feedback system, while shape memory segments 1610 can be actuated to constrict and provide a desired level of compression. Tape 1612 is affixed to inner layer 1606 and holds each of the shape memory segments 1610 in place relative to inner layer 1606. Different mechanisms for holding each shape memory segment 1610 in place relative to inner layer 1606 can be used in other embodiments.

In use, power is supplied to each of the shape memory segments 1610, such as by a battery or a cable coupled to an external source of power. Shape memory segments 1610 are actuated by heat. Due to resistive heating, current passing through shape memory segments 310 causes contraction of shape memory segments 1610. During contraction, shape memory segments 1610 are held in place vertically (with respect to the orientation shown in FIG. 16) by tape 1612. Each of the shape memory segments 1610 therefore provides compression through inner layer 1606 to the wearer of the garment.

Powered compression garments can overly constrict if power is constantly supplied. Conventional compression garments (such as pressurized air garments) avoid over-tightening the garment, but require a tension-measurement system and a corresponding processor and actuator. When the tension-measurement system of a conventional system detects that a level of tension in the garment is too high (i.e., the garment is over-inflated), the actuation mechanism (i.e., the air pump) is turned off or turned down. Over-inflation can result in the garment being uncomfortable to the wearer and can constrict blood or lymph flow, which defeats the therapeutic properties of the garment. The additional components, such as an actuator, processor, or tension-measuring system, can consume power in addition to what is required to inflate or otherwise compress the garment, can add weight and bulk to the garment, and are prone to failure.

In FIG. 3, this failure mode of conventional powered compression garments is remedied by apportioning compression garment 1600 into several segments, each of which is compressed by a separate loop of shape memory segments 1610. Unlike the sensor-actuator model described above, compression garment 1600 includes a series of switches 1608. Each one of the switches 1608 is connected, both mechanically and electrically, to a corresponding shape memory segment 1610. Under normal conditions, each switch 1608 and corresponding shape memory segment 1610 forms a closed circuit that receives power from a power source (not shown in FIG. 16). In the embodiment shown in FIG. 16, a power bus 1614 delivers power to each of the circuits.

In the event that the tension produced by any individual shape memory segment 1610 exceeds a predetermined threshold, the circuit is broken at the corresponding switch 1608. There is therefore no need for a separate actuator or tension sensing apparatus to manage compression levels. Removing these elements reduces the size and complexity of compression garment 1600, and reduces the power consumption of compression garment 1600 compared to pressurized air or actively monitored electrical conventional compression garments. This system also allows the garment to be initially oversized, which is important to allow the garment to fit a wide range of leg sizes, without needing to precisely design and measure the active material regions. The system can simply be powered blindly, and the active regions will constrict independently as necessary, for a given initial fit, until a desired tension is achieved.

In alternative embodiments, tape 1612 could be made up of multiple segments, attached to either (or both of) the inner layer 1606 or the outer layer 102B. Like outer layer 102B, inner layer 1606 can include one or more fasteners to don or doff the garment. In embodiments, inner layer 1606 can be mechanically coupled to outer layer 102B with the active components (e.g., switches 1608 and shape memory segments 1610 arranged therebetween. By interposing the active components between passive layers, the active segments are protected from external elements, and vice versa. Decoupling outer layer 102B from inner layer 1606 facilitates replacement of segments 1610 and switches 1608, for example with elements having different lengths, shape memory transition characteristics, or maximum tension values.

Figure 17:
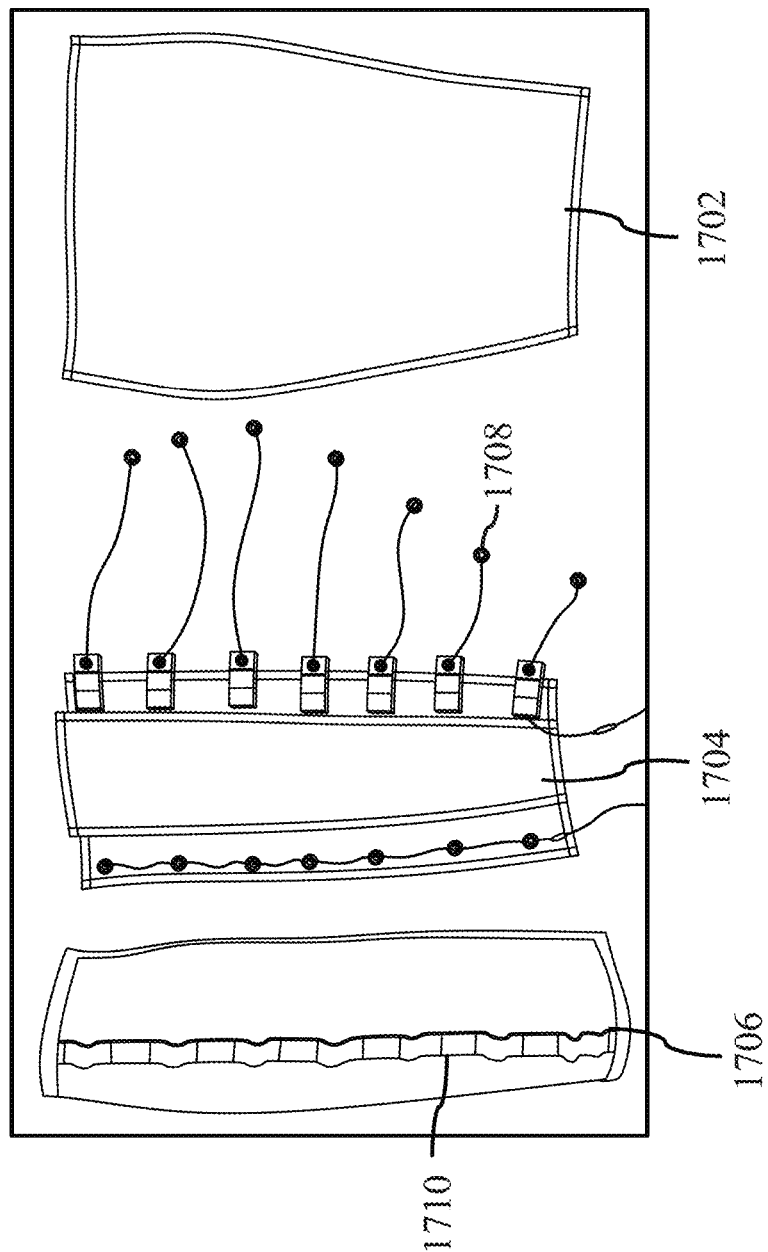
FIG. 17 is an exploded view of a three-layer active compression garment according to an embodiment.

FIG. 17 depicts an alternative embodiment having three layers: outer layer 1702, middle layer 1704, and inner layer 1706. Outer layer 1702 is similar to outer layer 102B as shown in and described with respect to FIG. 1B. Middle layer 1704 includes a plurality of circuits 1708, each of which includes a shape memory segment and a tension-limited switch as previously described with respect to FIG. 16. In the view shown in FIG. 17, the shape memory segment components of the circuits 1708 are loose, though in operation the circuits would wrap around middle layer 1704 such that the shape memory segments are attached to the switches at both ends.

Inner layer 1706 protects the user from the heat generated by the shape memory elements in the circuits 1708 and helps distribute the force generated by circuits 1708 circumferentially. In embodiments, inner layer 1706 can be made primarily of polytetrafluoroethylene (PTFE) sheets to provide a heat resistant surface that allows for the actuators to compress easily. A strip of fiberglass ribbon tape 1710 is sewn down vertically in the center of inner layer 408, with several open channels to route the circuits 1708 around the anterior side of the inner layer 1706 and prevent movement of the circuits 1708 relative inner layer 1706.

FIG. 18 is a circuit diagram corresponding to a compression garment, according to an embodiment. The circuit diagram depicted in FIG. 18 includes four independent circuit branches, indicated by independent vertical legs of the circuit that are arranged in parallel (C1-C4). Each shape memory actuator is represented by a resistor 1810 and a tension switch 1808. The entire system, including all of the circuit branches C1-C4, is powered by voltage source 1812.

Each circuit branch C1-C4 corresponds to the segments or circuits described above (e.g., the combined circuits of switches 1608 and their corresponding memory segments 1610 of FIG. 16, or the circuits 1708 of FIG. 17). As such, each circuit branch C1-C4 includes a switch 1808, which is a schematic representation of a tension-based switch, and an actuator 1810, coupled in series. If the first circuit branch C1 is under sufficient tension, the switch 1808 of that circuit branch C1 opens, such that no current flows through circuit branch C1. Power from voltage source 1812 nonetheless remains available to the other circuit branches C2-C4. Each of the switches 1808 can operate independently based upon tension at a different portion of a garment, for example, as depicted in FIGS. 1B, 16, and 17.

The shape memory actuators 1810 dissipate energy to cause contraction. In the examples described above, resistors 1810 can be made from an active material. Current through resistors 1810 causes heating, which activates the thermomechanical response of the resistors 1810 to cause both heating and corresponding contraction. Contraction of resistors 1810 can cause tension on the corresponding switches (i.e., switches 1808).

FIGS. 19A and 19B depict a switch 1908, according to an embodiment. Switch 1908 includes wire 1914, which can form a loop around a garment as described in more detail above. Wire 1914 can also be coupled to a voltage source (e.g., voltage supply 1812 of FIG. 18), which is not shown in FIGS. 19A and 19B. Wire 1914 is connected to contacts 1916. In FIG. 19A, contacts are touching one another, closing the circuit such that power flows through wire 1914. As current flows through wire 1914, it is heated and undergoes a transition to shrink or otherwise deform, increasing the tension on switch 1908. Once the tension on switch 1908 reaches some threshold, switch 1908 can expand such that contacts 1916 are separated to define a gap 1918. Once gap 1918 is formed, current cannot flow from one side of switch 1908 to the other, and in normal operating conditions the temperature of wire 1914 will begin to drop as current from the voltage supply no longer flows through it. After sufficient cooling and subsequent reduction in axial tension, the latch can return to the configuration depicted in FIG. 19A, re-engaging the circuit and beginning the process of heating/contraction again. Thus, switch 1908 of FIGS. 19A and 19B is a self-contained, independent control system that maintains a desired level of tension on a compression garment through periodic cycling of heating/tension and cooling/relaxation without requiring monitoring, communication, and processing systems.

FIG. 20A is a schematic diagram of an alternative design of a switch 2008, according to an embodiment. Expanded switch 2008' is shown in FIG. 20B, which is the same as switch 2008 of FIG. 20A in a different arrangement. Specifically, FIG. 20A shows wire 2014 that extends into switch 2008. Wire 2014 can be, for example, an active material element or a wire leading to a active material component. Within switch 2008, contacts 2016 are shown electrically coupled to one another in FIG. 20A, and electrically disconnected in FIG. 20B. The connection or disconnection of contacts 2016 is based upon a level of tension on switch 2008, 2008'. The level of tension is in turn based on the temperature of wire 2014 (or an active element coupled to wire 2014) that causes contraction or other deformation of a circuit including switch 2008, 2008'. FIG. 20B also depicts solder joints 2018, which pull on switch 2008 to expand into the open-circuit position 2008' as wire 2014 moves. In alternative embodiments, an elastic material could be incorporated into the body of the switch, and the elastic properties such as stiffness and thickness could be varied to tailor the tension at which the circuit breaks.

Figure 21:
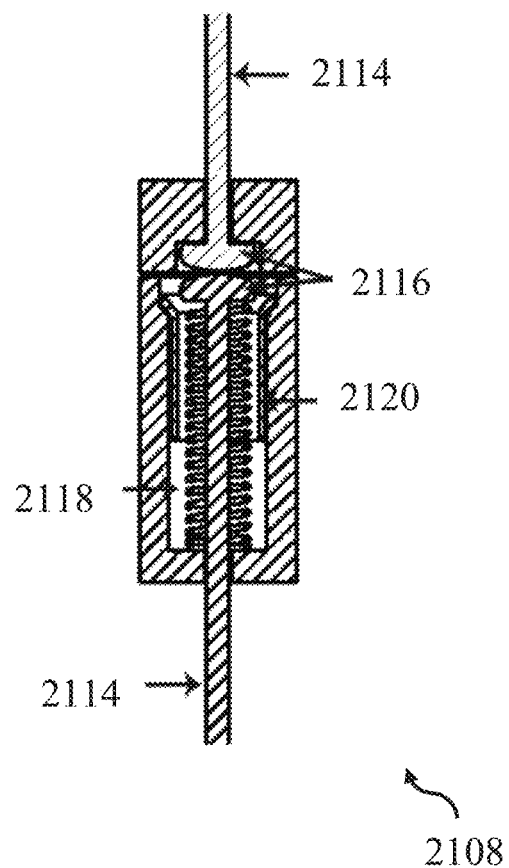
FIG. 21 is a schematic view of an elastic circuit-breaking switch incorporating a spring according to an embodiment.

FIG. 21 depicts an alternative version of switch 2108, according to an embodiment in which wire 2114 is connected to heads 2116 that are mechanically biased to be in contact with one another by spring 2118 and bushing 2120. When tension on wire 2114 exceeds the biasing tension of spring 2118, bushing 2120 will slide along the body of switch 2108 and the electrical connection between heads 2116 will be disconnected.

Figures 22A, 22B:
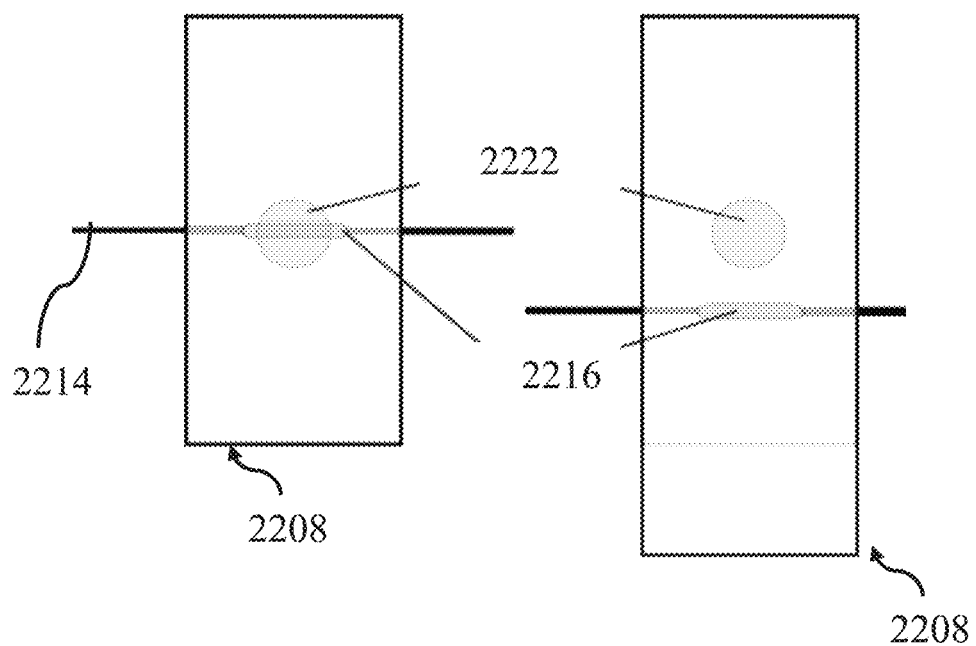
FIGS. 22A and 22B are schematic views of an elastic circuit-breaking switch incorporating a reed switch according to an embodiment.

In embodiments, spring 2118 can be selected to have a spring constant corresponding to a desired maximum tension before electrical disconnection at switch 2108. In embodiments, spring 2118 can be adjustable (for example, by placing an insert below spring 2118 such that it is further compressed to increase the tension before electrical disconnection at switch 2108), and additional springs could be added to the system to further tailor the elastic response in some embodiments. FIGS. 22A and 22B depict closed and open circuits, respectively, according to another embodiment. FIG. 22A depicts switch 2208 in the closed configuration, in which current can travel through wire 2214 and switch 2218. In contrast, FIG. 22B depicts switch 2208' in a closed configuration, in which current cannot travel through switch 2208'. The closed and open configurations of switch 2208, 2208' are facilitated by a reed switch 2216 and a magnet 2222. Deformation of wire 2214 or an appurtenant structure can cause movement of reed switch 2216 relative to magnet 2222. In the absence of sufficient magnetic field, such as that provided by magnet 2222, reed switch 2216 opens and the circuit is broken.

Aesthetic Garments

Figure 23A:
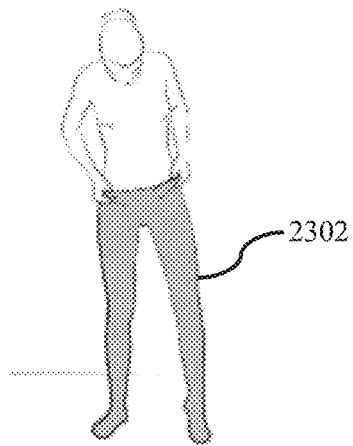
FIGS. 23A-23D depict a method for donning an unpowered, active compression garment according to an embodiment.
Figure 23B:
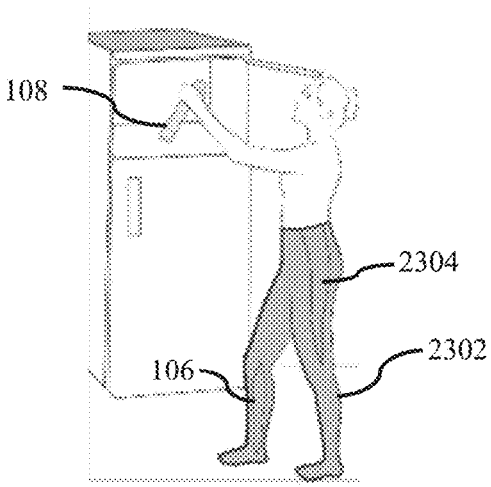
Figure 23C:
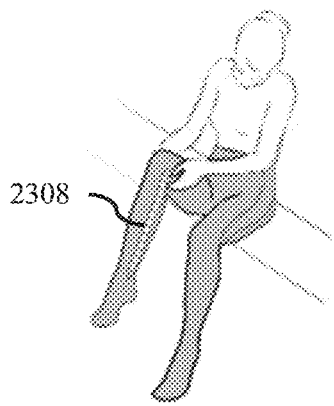
Figure 23D:
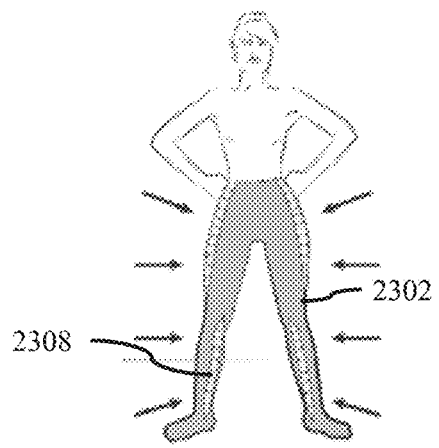

FIGS. 23A-23D show a process for donning a compression garment according to an embodiment. FIG. 23A depicts a user donning passive garment 2302, which is loose-fitting leggings. Passive garment 2302 includes hip panel 2304 and calf panel 2306, which are configured to receive active inserts 2308, as shown in FIGS. 23B-23D.

Active inserts 2308 of FIGS. 23A-23D are chilled or frozen prior to use, as shown in FIG. 23B. Active inserts 108 include superelastic components that can transition between an expanded, loose martensite state when cold and a condensed, tight austenite state when warm. In the embodiment shown in FIGS. 23A-23D, the transition temperature between the martensite and austenite temperatures is between freezer temperature and skin temperature of the wearer, such as between about −20° C. and about 35° C. In alternative embodiments, the transition temperature could be between refrigerator temperature and skin temperature, or in other words between about 0° C. and about 35° C. In still further embodiments, the transition temperature could be between typical ambient room temperature and skin temperature, or in other words between about 20° C. and about 35° C. In embodiments, the transition temperature could be slightly lower than skin temperature, as active panels 2308 may be slightly cooler than the skin of the user. For example, the transition temperature could be below about 30° C., in embodiments.

As shown in FIGS. 23C and 23D, the user attaches active inserts 2308 to hip panel 2304 and calf panel 2306. This attaching can comprise temporarily coupling active inserts 2308 to, or temporarily embedding active inserts 2308 in, hip panel 2304, such as by zipping the active insert 2308 into the hip panel 2304 along a vertical path. As shown in FIG. 23D, exposure to skin temperature causes active inserts 2308 to undergo shape memory transition and contract. The resulting contraction pulls at passive garment 2302 and causes compression on the user. The compression garment that is formed by the combination of passive garment 2302 and active inserts 2308 requires no source of external power other than the body temperature of the user, while remaining easy to don or doff because passive garment 2302 can be loose-fitting and active inserts 2308 can be attached in the loose, martensite state.

In alternative embodiments, a variety of other compression garments can be created that incorporate both passive and active components, and in which the active components have a transition temperature lower than skin temperature of the user. For example, in addition to leggings, compression garments incorporating these features could be created that are shaped as socks, girdles, corsets, belts, suspenders, shoes, or compression sleeves for elbows, arms, wrists, hands, fingers, ankles, knees, legs, or some other part of the body, as well as any other type of garment or wearable item that provides compression. In general, devices described herein can replace lacing structures or other tightening or fastening mechanisms with self-tightening panels.

In addition to ease of tightening or applying pressure, the stages shown and described with respect to FIGS. 23A-23D facilitate doffing more readily than conventional, undersized compression garments. A user can relieve the pressure from the garment or remove the garment by detaching the active insert (e.g., by unzipping it from the corresponding panel area). The active insert can optionally be placed back in a refrigerated environment, in embodiments where cooling below room temperature is needed to revert the insert to martensite condition. The stages described with respect to FIGS. 23A-23D can be repeated as many times as desired by stretching the active insert back to its loose state and reattaching to the panel.

The stages shown in FIGS. 23A-23D are not necessarily in order. For example, active inserts 108 could be attached to passive garment 2302 before donning, in some embodiments. This can be beneficial where attaching active inserts in the order depicted in FIGS. 23A-23D may be difficult, such as compression garments that are positioned on the user's hands or wrists.

Figure 24A:
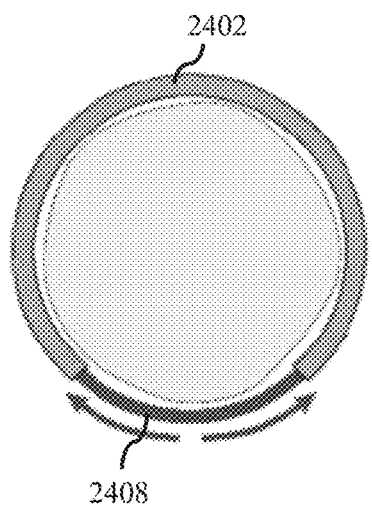
FIGS. 24A and 24B are top plan views of a cross-section of an active compression garment having a shape memory alloy insert according to an embodiment.
Figure 24B:
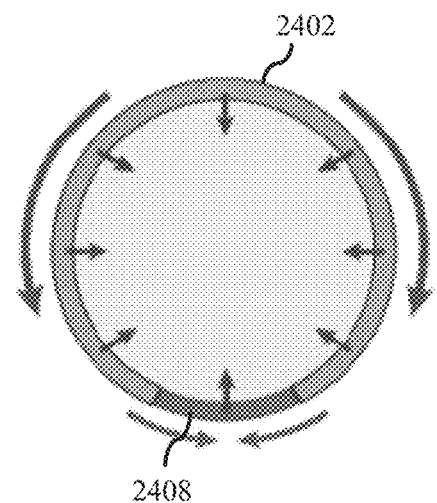

FIGS. 24A and 24B are cross-sectional top views of passive garment 2402 and active insert 2408, according to an embodiment. Passive garment 2402 is similar to passive garment 2302 that is described above in more detail with respect to FIGS. 23A-23D. Likewise, active insert 2408 is similar to active insert 2308 that is described above in more detail with respect to FIGS. 23A-23D.

FIG. 24A depicts passive garment 2402 attached to active insert 2408 in a loose, martensite arrangement. In contrast, FIG. 24B shows the same passive garment 2402 attached to the same active insert 2408, but in FIG. 24B active insert 2408 is above the shape memory transition temperature and is compressed. The resulting movement of passive garment 2402 and compression are depicted with arrows in FIG. 24B.

Figure 25A:
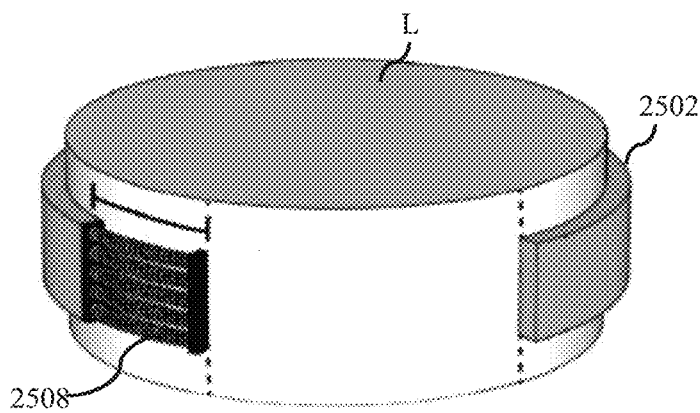
FIGS. 25A-25C are isometric views of a portion of an active compression garment having multiple shape memory alloy bands, according to an embodiment.
Figure 25B:
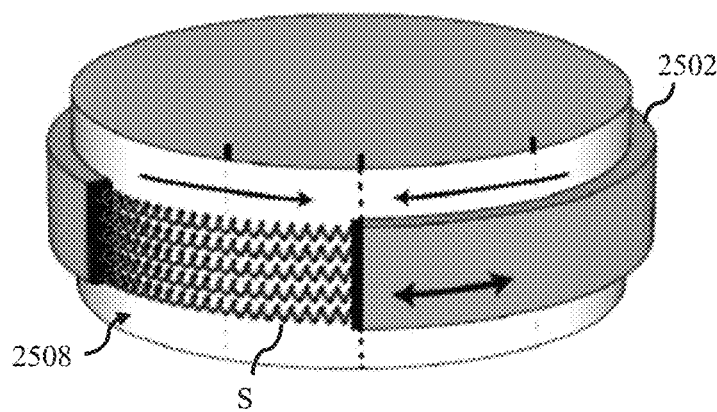
Figure 25C:
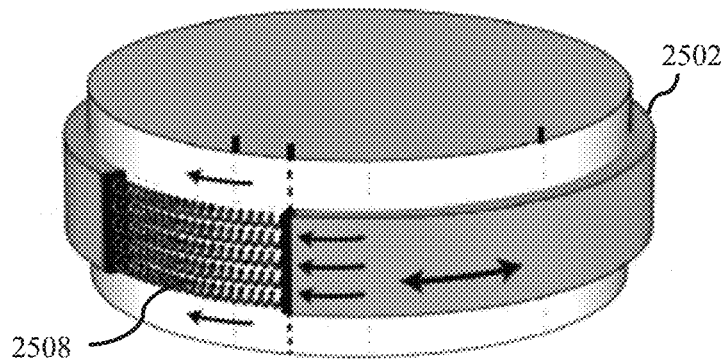

In embodiments, multiple shape memory elements can make up a single active insert. For example, FIGS. 25A-25C show compression of a combined passive garment 2502 and active insert 2508. FIG. 25A shows passive garment 2502 and active insert 2508 extending partially around limb L. Active insert 2508 includes a series of five shape memory spring elements S. FIG. 25B shows active insert 2508 coupled to passive element 2502 at two ends to form a complete loop around limb L. As shown in FIG. 25B, shape memory spring elements S are in a loose, martensite state. FIG. 25C, in contrast, depicts active insert 2508 in which shape memory spring elements S have undergone shape memory transition to an austenite state, causing compression on limb L as indicated by arrows.

While spring-shaped shape-memory active materials are useful as active inserts, the active regions in alternative embodiments could implement a variety of different active materials in a variety of shapes, such as knits, so long as the insert produces a shrinkage that is temperature-induced.

Figure 26A:
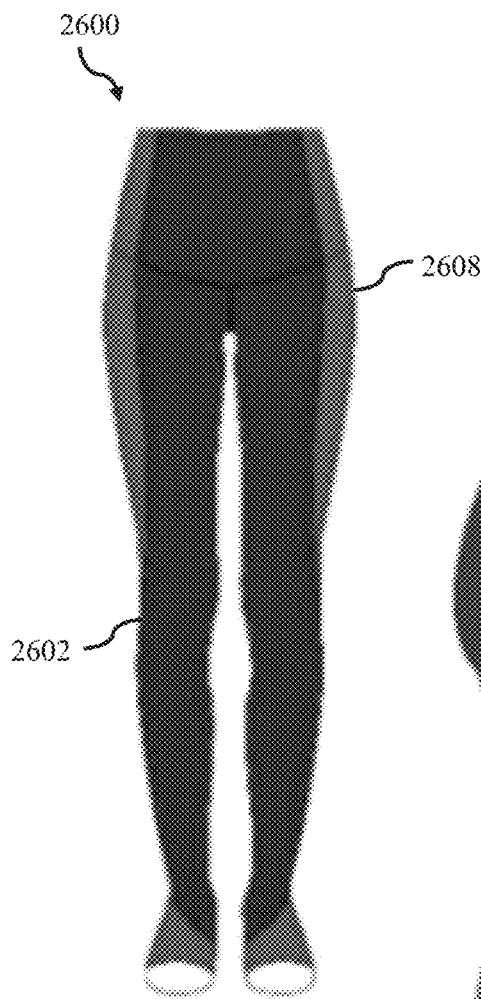
FIGS. 26A-26C are front, side, and back views of a garment, according to an embodiment.
Figure 26B:
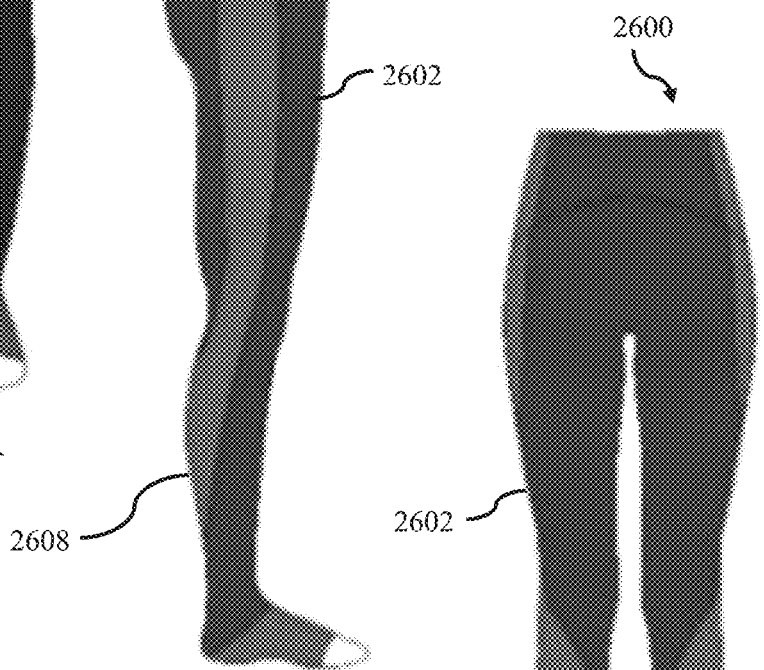
Figure 26C:
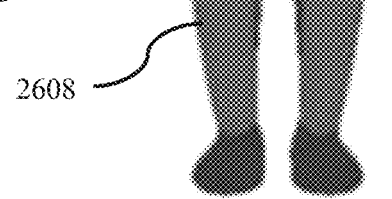

FIGS. 26A-4C are front, side, and back views of a garment 2600, respectively. Garment 2600 includes passive portion 2602 and active insert portion 2608. Passive portion 2602 and active insert portion 2608 are similar to their counterparts described above with respect to the other drawings (i.e., passive portions 2302, 2402, 2502 and active inserts 2308, 2408, 2508 of FIGS. 23, 24, and 25).

Garment 2600 incorporates elements from different categories of garments and combines them in a way that is both functional and comfortable.

| Category | Design Requirement | Design Solution |
|---|---|---|
| Design/Form | Fashionable, socially acceptable | Leggings |
| Textiles | Breathable, soft | Evaporative-cooling fibers |
| Don/Doff | Easy, pain-free | Stretch panel with zip-on actuators |

For example, passive portion 2602 can be leggings material, which is fashionable and socially acceptable. Active insert portions 2608 can comprise fabric portions with zippers, snaps, hooks and eyes, magnets, or other fasteners to receive an active insert as described above with respect to FIGS. 23-25. The combination of textile and received inserts provides the benefits of fabrics for breathability and softness while also providing compression when the active inserts are attached.

Figure 27:
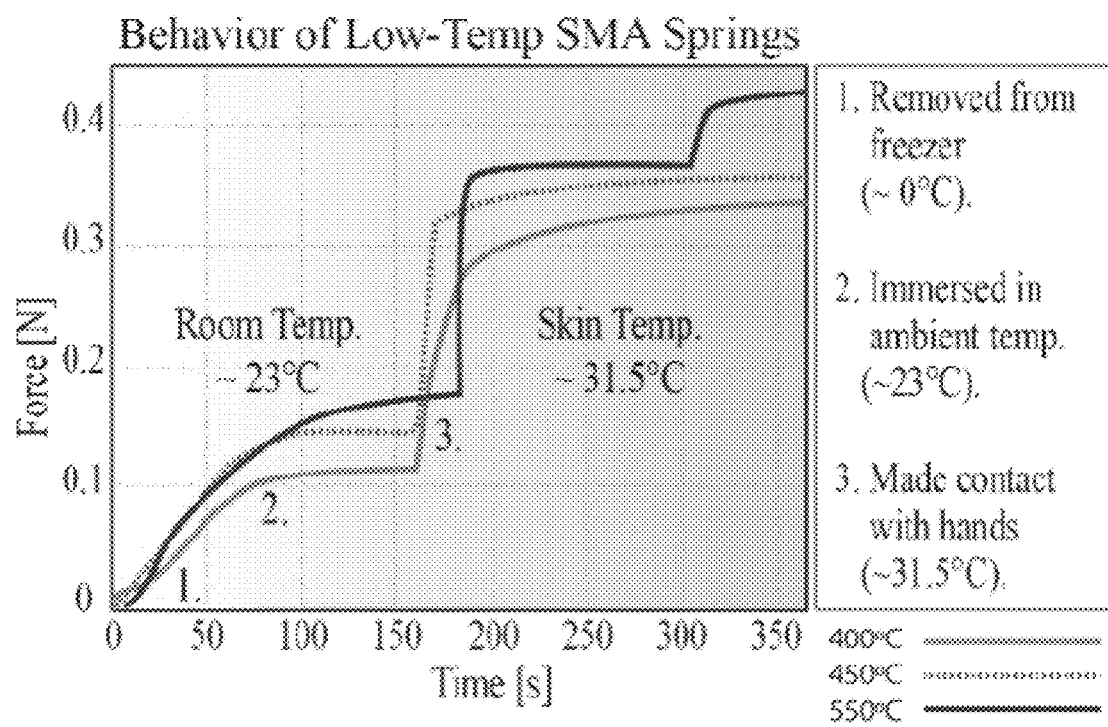
FIG. 27 is a chart of a shape memory transition of a shape memory component that responds at room and body temperature, according to an embodiment.

FIG. 27 is a graph of the compression force of a shape-memory spring as a function of time after removal from a freezer at about 0° C. As shown in FIG. 27, during the first about 150-200 seconds, the shape-memory spring increases compressive force slowly as it approaches room temperature of about 23° C. Upon contact with a user's hands (at about 31.5° C.), the compressive force increases rapidly from about 0.1 N to about 0.35 N.

FIG. 27 depicts the increasing compressive force for three shape-memory coils, heat treated at three different temperatures of 400° C., 450° C., and 550° C. Changing the heat treatment temperature of the material affects both the temperature at which the transition occurs, as well as the compressive force exerted by a coil after transition. As shown in FIG. 27, the temperature at which the heat treatment is conducted can affect the time to active material transition and the level of compressive force exerted by the coil. The force and extend of the material shrinkage also depends on alloy composition, such as the relative balance of nickel and titanium in a NiTi alloy. By altering either the alloy composition or the heat treatment, the force and transition temperatures can be strategically affected (so the material will react at higher/lower temperatures or forces).

FIGS. 28A-28C show active insert 2808, which includes a plurality of shape memory bands 2810. Active insert 2808 also includes zippers 2812 to couple active insert 2808 to passive garment 2802. FIGS. 28B and 28C show zippers 2812 in fully zipped and partially zipped arrangements, respectively. As described above, in alternative embodiments zippers 2812 can be replaced by or used in addition to some other coupling mechanism, which can be any of a number of mechanical or magnetic couplings such as snaps, buttons, hooks and eyes, or clips, among others.

Figure 29A:
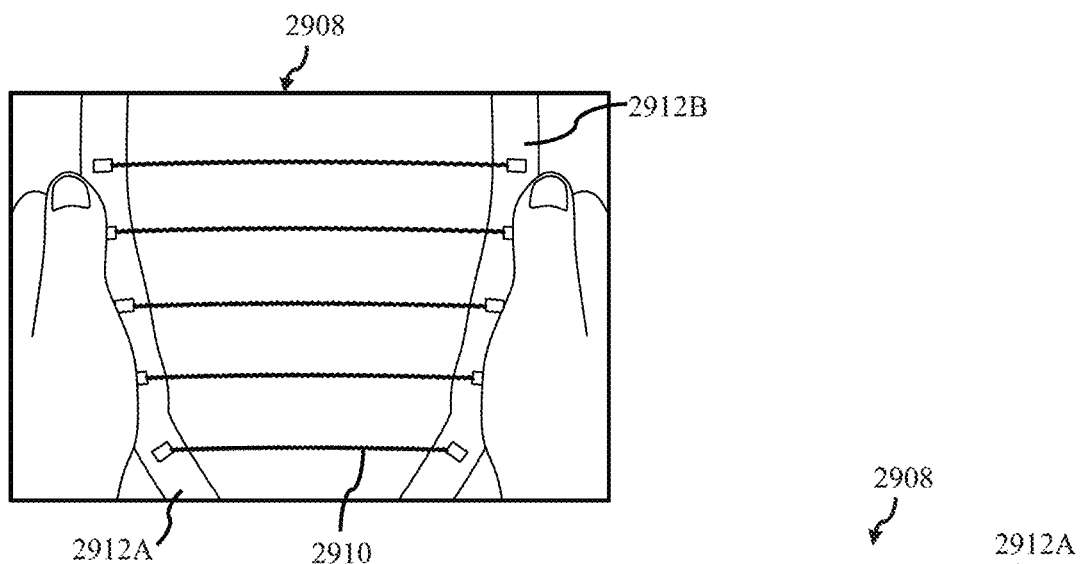
FIGS. 29A and 29B are plan views of a segmented compression insert in martensite and austenite states, respectively.
Figure 29B:
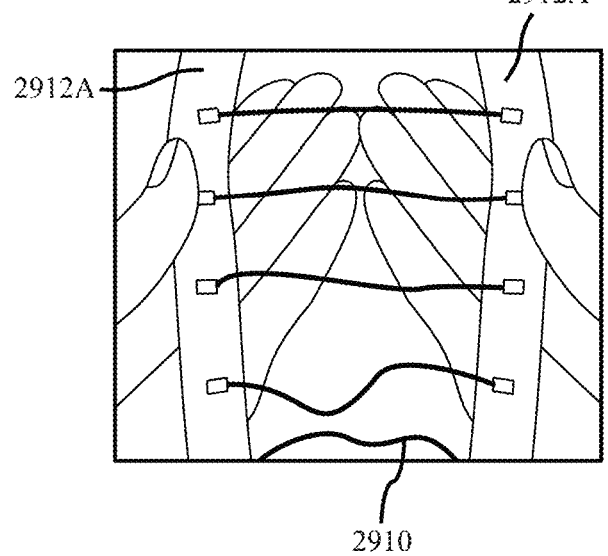

FIGS. 29A and 29B depict active insert 2908, which includes a plurality of shape memory bands 2910. As shown in FIG. 29A, shape memory bands 2910 are in a loose, martensite state, while in FIG. 29B shape memory bands 2910 are in a tight, compressed, austenite state. Accordingly, the width of active insert 2908 is larger in FIG. 29A than it is in FIG. 29B. Additionally, FIGS. 29A and 29B show first coupling 2912A and second coupling 2912B, which are zippers in the embodiment depicted in FIGS. 29A and 29B.

As shown in FIGS. 29A and 29B, active insert 2908 is at least partially transparent. Accordingly, unlike many undersized compression garment, active insert 2908 can be used with a passive garment and maintain fashionable or functional features of that underlying passive garment. In addition to aesthetics, this can be helpful to maintain visibility in, for example, an athletic garment that includes reflective elements or a sports team garment, such as a uniform, that includes team colors or players identifiers. In embodiments, the individual shape memory bands 2910 of active insert 2908 exhibit different levels of shape memory transition, such that the compression provided at different portions of the garment varies. Additionally, in alternative embodiments different active materials could be used (such as a sparse shape-memory alloy knit) such that the garment remains low-profile and displays a comfortable, aesthetically-pleasing, non-bulky and non-cumbersome compression garment. Still further, the active insert could be constructed such that it is more solid, with active elements contained within pockets or channels, in embodiments where it is desirable for the garment to hide the presence of the active materials.

Materials, Fibers, Filaments, and Yarns

Previously-described designs have shown rows or segments of active material within or attached to a section of passive fabric. In some embodiments, however, the fabric will be a more complex shape. For example, in some embodiments a functional fabric can be a part of a garment. Garments typically include complex shapes including bends, constrictions, apertures, and seams. Use of active rows and passive rows in a functional garment can be useful in many applications. To make more complex functional garments it can desirable to have the ability to position functional elements more precisely.

Figure 30:
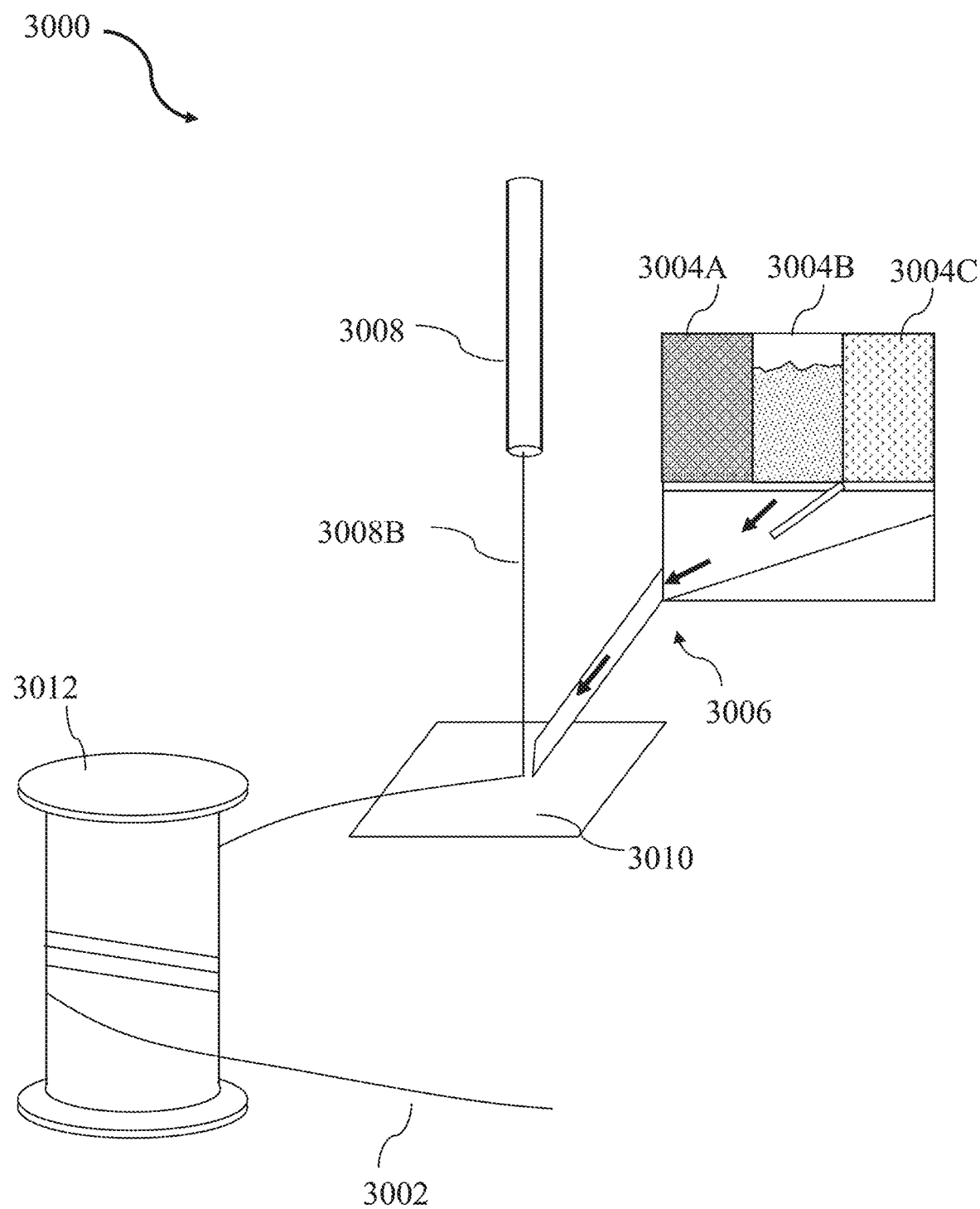
FIG. 30 depicts an additive manufacturing system producing a multi-material yarn/filament according to an embodiment.

FIG. 30 shows a system 3000 for manufacturing a heterogeneous filament 3002. Heterogeneous filament 3002 is made from materials within hoppers 3004A-3004C. Each of hoppers 3004A-3004C includes a different material that is selectively delivered by delivery subsystem 3006 to a workstation 3010. Hoppers 3004A-3004C can include materials such as plastics, ceramics, metal pulverant materials, sinterable powders, and other types or forms of materials. At least one of hoppers 3004A-3004C includes an active material such as a shape memory alloy, a piezoelectric material, or an electrically conductive or semiconductive material. Depending upon the number of materials of a desired heterogeneous filament 3002, the number of hoppers 3004A-3004C can be varied.

As shown in FIG. 30, hopper 3004B is open to release pulverant material to delivery subsystem 3006, which delivers that material (as indicated by arrows) to workstation 3010. System 3000 also includes a laser source 3008 that directs a beam 3008B towards workstation 3010. Delivery subsystem 3006 and laser source 3008 can be coordinated such that pulverant material from one of the hoppers 3004A-3004C is received at the position of workstation 3010 where beam 3008B is targeted. Beam 3008B provides energy sufficient to sinter or melt the material from hoppers 3004 to form heterogeneous filament 3002. To change materials, delivery subsystem 3006 can select a different hopper 3004A-3004C for use as a material supply. For some materials, a mixture of multiple materials from multiple hoppers 3004A-3004C could be used for some segments of the filament. Depending on the materials used, laser 3008 may also be modified to emit a beam 3008B at a different energy level, wavelength, or intensity corresponding to the new material.

In FIG. 30, heterogeneous filament 3002 that is formed at workstation 3010 is wrapped on spool 3012 for use in creating an active fabric. Spool 3012 can be used to collect heterogeneous filament 3002 as it is created, making way for additive manufacturing of additional length of heterogeneous filament 3002. In alternative embodiments, spool 3012 need not be used to gather heterogeneous filament 3002. Instead, heterogeneous filament 3002 could be routed directly to a functional fabric that is being manufactured, to a loom, or to some other location for either storage or fabric production. In embodiments, spool 3012 can be a bobbin, a spindle, a reel, or some other object to hold the filament 3002 prior to incorporation into a fabric.

Although the embodiment of FIG. 30 depicts selective laser sintering, other types of additive manufacturing can be used in other embodiments. Depending upon the materials that make up heterogeneous filament 3002, direct metal laser sintering, e-beam melting, selective laser melting, or fused deposition modeling can be used, for example. In embodiments, multiple-head systems (i.e., systems incorporating multiple delivery subsystems 3006) can be used to create sharp transitions between materials in heterogeneous filament 3002. In this context, a "sharp" transition is one in which the material that makes up heterogeneous filament 3002 changes in less than the length of one loop of knitted fabric.

By incorporating these sharp materials transitions, system 3000 enables a new paradigm for functional or smart garment manufacturing. Processes for making and using heterogeneous filaments can result in uniquely functional or active textiles using multi-material additive manufacturing combined with traditional textile equipment such as a circular knitting machine. Filaments can also be pre-manipulated, for example to form braids or yarn-like structures from multiple filaments with strategically varying properties. Elasticity, stiffness, conductivity, activation, surface properties, and other attributes of the filament, yarn, or bundle of filaments can be modified selectively along the length of each individual strand. For example, by implementing a periodic region of conductivity into the filament, a subsequent knit structure can be created where the conductive regions align spatially to create a 3D conductive pathway through the garment, entirely by virtue of the filament properties.

Figure 31:
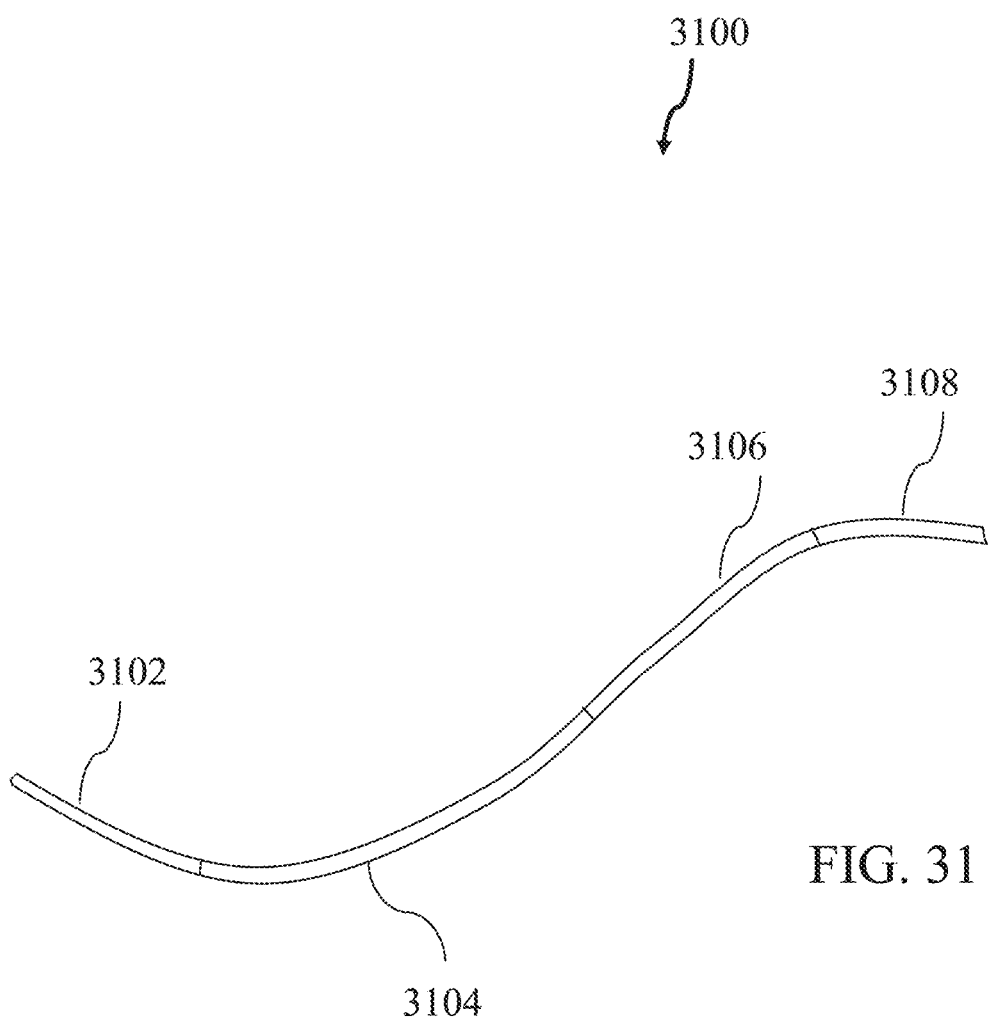
FIG. 31 is a detailed view of a portion of a multi-material yarn/filament according to an embodiment.

FIG. 31 depicts a heterogeneous filament 3100 according to an embodiment. FIG. 31 is a detailed view, showing a portion of heterogeneous filament 3100 that includes a first segment 3102, a second segment 3104, a third segment 3106, and a fourth segment 3108. Each of the segments 3102, 3104, 3106, and 3108 can be made of a different material, as described above with respect to FIG. 30. Heterogeneous filament 3100 can be used to manufacture a functional fabric. As referred to above, use of active materials in one or more of the segments 3102-3108 facilitates selective placement of functional regions within a fabric, or within an article such as a garment that includes the fabric.

Activation of a material within heterogeneous filament 3100 can occur before, during, and after manufacture of a fabric, in embodiments. For example, in some garments it may be desirable for a functional area of the fabric to be under higher tension, or to have a tighter and denser knit pattern. Heterogeneous filament 3100 can include second portion 3104 that undergoes a transition from martensite to austenite when it reaches a temperature somewhere below the skin temperature of a user. During manufacture of the garment in an environment that is lower than that temperature, second portion 3104 remains in the martensite phase and is pliable and loose. But upon donning the garment, the desired increase in tension and knit pattern density will occur as second portion 3104 enters the austenite phase from contact with a user's body. The opposite effect can be created if loosening is desired: the fabric can be manufactured at temperatures above the transition temperature, and after manufacturing any portions of the heterogeneous filament 3100 that are made of a shape memory component will relax to the martensite phase. Transitions between phases could also be produced during manufacturing of a fabric by, for example, passing a heterogeneous filament across heated or cooled rollers that cause the filament to enter the desired phase. In other embodiments such as fabrics that include filaments made of conductive shape memory alloys or heterogeneous filaments having piezoelectric components, electrical current or field can be applied during manufacturing to effect a particular shape or other attribute.

Filament 3100 can have a particular periodicity of components in embodiments where knitting in the round will be used, for example Filament 3100 can be used for woven fabrics in which particular patterns of functional or active material are used, and for which placement of the materials in each thread can be coordinated. In general, filament 3100 can include active and passive components that are positioned such that, when a fabric or garment is produced therefrom, a particular functional effect is produced. When producing filament 3100, considerations for placement of the active and passive component include the type of weaving, knitting, or sewing pattern to be used, and the fabric or garment size, for example. In one embodiment, a garment can be customized for a particular wearer. Functional components can be customized to that wearer's body using measurements of the wearer, as well as considerations for the ease of the knitted fabric, which determine the placement of functional components within each filament as well as overall filament length.

Figure 32:
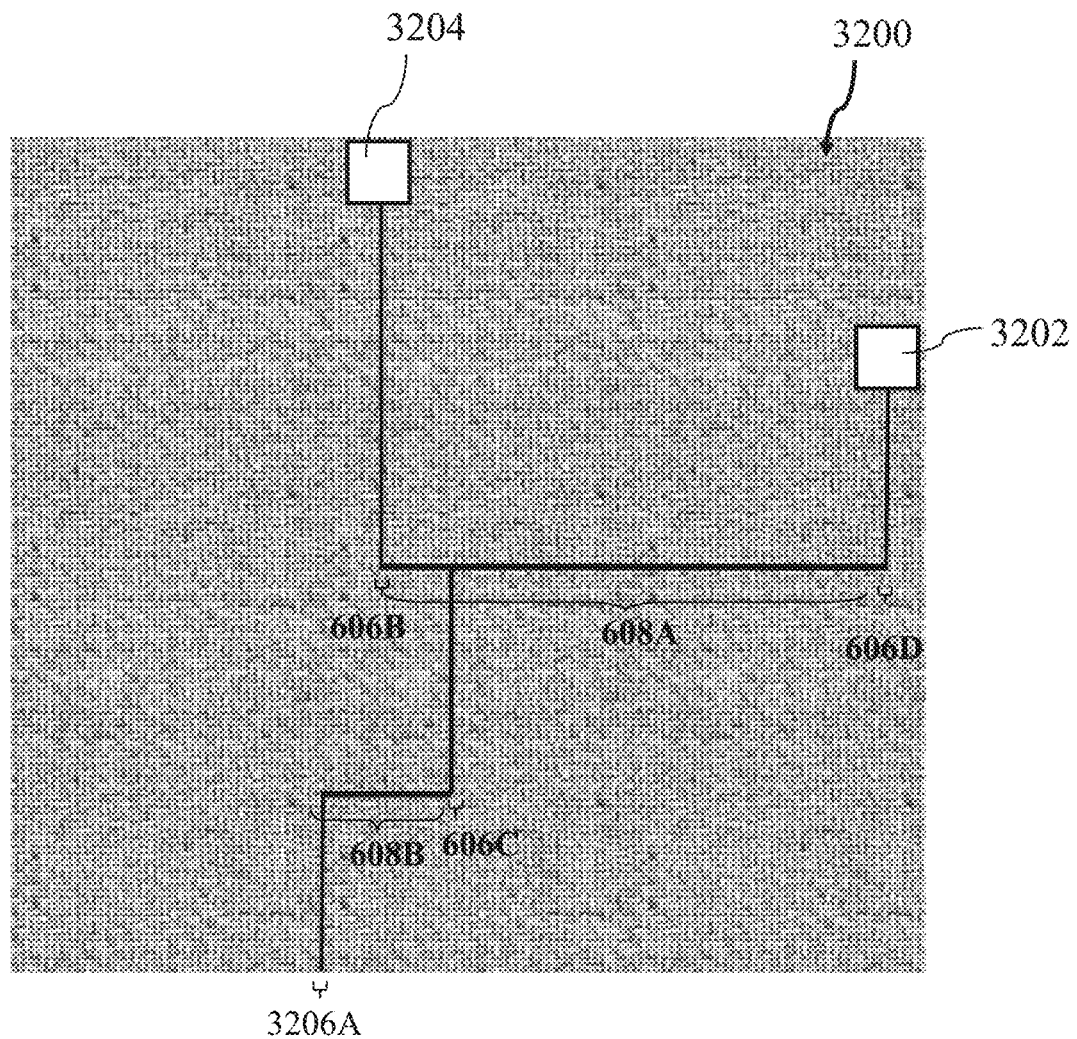
FIG. 32 is a plan view of a fabric incorporating electrically conductive leads according to an embodiment.

FIG. 32 is a plan view of a knitted fabric 3200. Knitted fabric 3200 is formed from a plurality of heterogeneous filaments arranged in rows. Knitted fabric 3200 is a functional fabric, and is configured to monitor an attribute of the wearer using sensor 3202 and sensor 3204. Sensors 3202 and 3204 are connected to an electrical pathway that spans multiple rows of fabric 3200.

Communication with sensors 3202 and 3204 can include, for example, delivery of power from a central power source (not shown) to each of the sensors 3202 and 3204. Delivering power in this way reduces the required complexity of sensors 3202 and 3204, as they need not include an integral battery.

Communication with sensors 3202 and 3204 can also include one- or two-way communication of information. For example, sensor 3202 can be a pulse monitor, and sensor 3204 can be a moisture or sweat detector. Each of the sensors 3202 and 3204 can send information to a central controller (not shown) along the electrical pathway. Delivering information in this way reduces the required complexity of sensors 3202 and 3204, as they need not include wireless transmission functionality and no wiring external to the fabric is needed.

As shown in FIG. 32, conductive portions are shown in black while non-conductive portions are shown in gray. Fabric 3200 includes four lengthwise conductive segments (3206A, 3206B, 3206C, and 3206D). Lengthwise conductive segments 3206A-3206D are segments of conductive material that extend along the length of the filaments that make the fabric. That is, they are extended multi-loop portions of rows that are conductive. Fabric 3200 also includes two transverse conductive segments 3208A and 3208B. Transverse conductive segments 3208A and 3208B extend across multiple rows, such that the conductive pattern crosses the fabric.

Use of heterogeneous filament or yarn causes electrical interconnection between sensors 3202 and 3204 that would otherwise require inserting a wire along or through the fabric. Use of heterogeneous filaments therefore reduces the complexity of the fabric by obviating the need for a wire. Furthermore, fabric 3200 is more versatile than a fabric in which a wire has been added, because conductivity is maintained even when the fabric 3200 is stretched or compressed. In embodiments, fabric 3200 can be interposed between two insulating layers so that the electrically conductive portions are not exposed to a wearer or to an exterior of a garment that incorporates fabric 3200. A power source can also be arranged between two insulating layers, or a port can be created in the insulating layer leading to the conductive portion of the functional fabric.

Heterogeneous filaments with electrically conductive portions can be knit into conductive patterns that include curved or irregular conductive paths, or even extended regions that serve as electrodes or conductive pads. In some embodiments, the pathway can be three-dimensional and pass through adjacent stacked layers of woven or knitted fabrics. Although fabric 3200 is shown as including conductive paths that are linear and include right angles, in alternative embodiments this need not be the case. Knit patterns always remain in contact with the same loops, no matter how the fabric itself is deformed. Accordingly, fabric 3200 maintains robust electrically conductive paths even after undergoing deformation.

Figure 33:
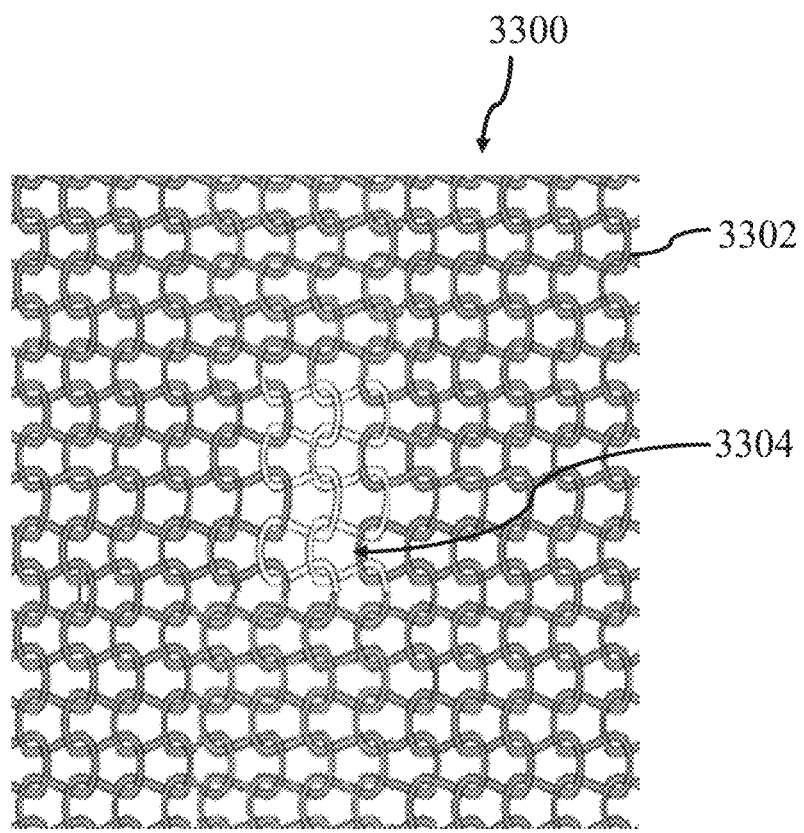
FIG. 33 is a schematic view of a knitted material comprising a series of multi-material filaments according to an embodiment.

FIG. 33 is a detailed schematic view of a fabric 3300 that is at least partially made from heterogeneous filaments. As shown in FIG. 33, fabric 3300 includes active portion 3302 and passive portion 3304. Passive portion 3304 is positioned within active portion 3302, and is made up of the same filaments that make up active portion 3302.

In the embodiment shown in FIG. 33, active portion 3302 can be made of a shape memory material that will contract upon application of heat, for example. This type of active material can be desirable for compression garments, for example. In compression garments, however, uniform compression throughout the entirety of fabric 3300 may not always be desirable. For example, a compression garment could be used to compress an arm, but compression at the elbow may not be desirable as it would unduly limit the movement of the arm. Therefore, passive portion 3304 can be arranged at the location of a garment where the elbow of a user will be positioned in regular use.

Figure 34:
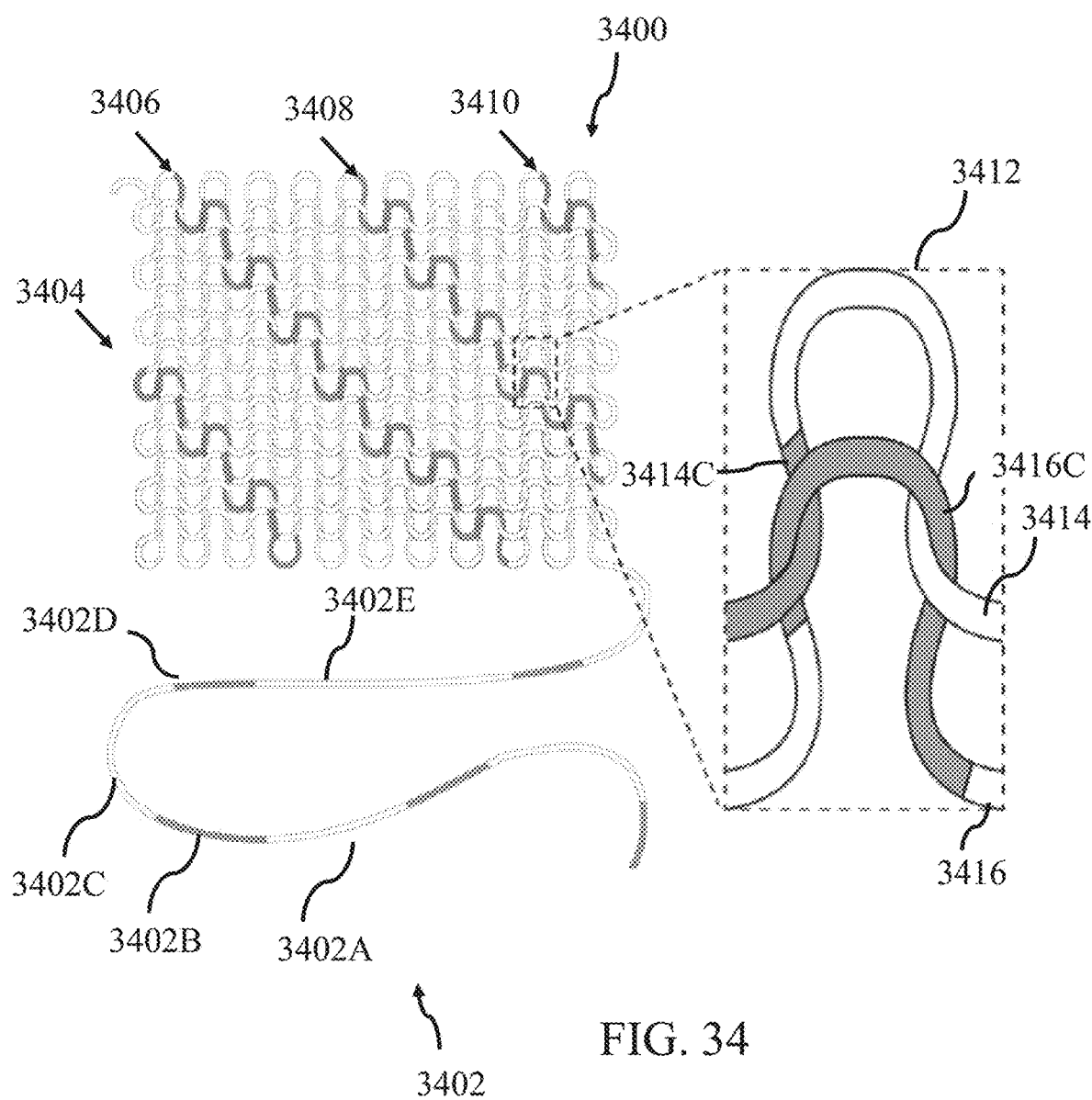
FIG. 34 is a schematic view of a multimaterial filament formed into a functional fabric according to an embodiment.

FIG. 34 depicts a functional fabric 3400 comprised of a single heterogeneous filament 3402. Filament 3402 is comprised of passive sections (non-shaded portions, for example 3402A, 3402C, 3402E) and functional sections (shaded portions, for example 3402B, 3402D). In the embodiment shown in FIG. 34, the functional sections are conductive. Filament 3402 is knitted to form fabric 3400, which includes conductive pathways (3404, 3406, 3408, 3410).

Exploded section 3412 shows the interconnection between a first portion 3414 of filament 3402 and a second portion 3416 of filament 3402 in detail. As shown in exploded section 3412, conductive section 3414C of first portion 3414 is positioned adjacent to conductive section 3416C of second portion 3416. Such interconnections can be used to maintain a conductive pathway (3404, 3406, 3408, 3410) between any locations on fabric 3400 as desired. Regions of functional materials (such as conductive pathways 3404, 3406, 3408, and 3410) can transcend or meander between columns and rows of a single filament 3402 formed into a fabric 3400, as desired by a fabric designer. Heterogeneous regions of filament 3402 can be intentionally sized and positioned so that far greater functional or active capability can be obtained than what is achievable by adding homogeneous functional fibers on a row by row basis. In alternative embodiments, multiple filaments could be combined or woven to create similar effects to the single-filament fabric shown in FIG. 34.

In embodiments, functional features described above could be combined with one another in any number of ways. For example, mechanical compression can be provided at the same time that electrical signal is transmitted across the garment. One example of such a garment is a blood pressure cuff, which can be constricted by some external stimulus (such as connection of an electrical supply to a piezoelectric or shape memory component of the blood pressure cuff) while also transmitting blood pressure and pulse information across a conductive pathway.

In another embodiment, thermal and mechanical functional properties could be combined in one garment. One example of such a garment is a hot or cold pack, which can be caused to constrict around an injured portion of a user while also undergoing an endothermic transition, exothermic transition, or resistive heating.

In various embodiments of functional fabrics incorporating electrical, mechanical, and thermal features, heterogeneous filaments can include portions that include corresponding electrically-active, mechanically-active, and thermally-active features. In embodiments, these features can be located within the same filament(s). Additive manufacturing of the individual filaments can be used to create continuous fabric that switches from passive material to active material (or from one type of active material to another type of active material) in a relatively sharp transition. As described above, the transition distance from one type of material to another can be less than the length of one loop of the knitted material formed with the heterogeneous filament.

In alternative embodiments, woven fabrics could be made using heterogeneous filaments, in addition to the knitted fabrics described above. Activation of the active materials can be provided by an electrical source, a thermal source, or by a wearer. For example, exposure to moisture or sweat can cause activation of an active fabric.

Combinations and Intercombinations

In embodiments, functional fabrics can be created that are used for purposes other than as garments. For example, in one embodiment a functional fabric can be moisture-sensitive to cause closure of a dry bag upon contact with water. In another embodiment, a crib liner can generate an indication of contact with moisture. In another embodiment, a heat shield fabric can include functional components that couple an integrated thermometer to a remote display via an integrated conductive path. In another embodiment, a pad for use in a wheelchair, stander, walker, pillow, bedding, or bandage can include a shape memory component configured to deform to fit or support a patient upon warming. In another embodiment, a cleaning device such as a cloth, mop, or towel can include functional aspects such as color change upon contact with a particular material. For example, a functional fabric could display a red color pattern for certain chemicals, or a green color pattern for other chemicals. These are only some examples of possible applications and uses, and many others are possible and contemplated.

The features described herein are interoperable unless otherwise expressly indicated. For example, the section describing materials could be used to create filaments or yarns that are used to generate medical compression devices or aesthetic, self-fitting garments. Even these garments need not be mutually exclusive, as a single garment or fabric could include filaments that are designed to maximize displacement when compressing (for aesthetic or self-fitting purposes) and a second set of filaments that compress less distance but with a level of pressure that is suitable for medical purposes. The transition temperatures of these different types of filaments can be tuned as desired, as described with respect to FIG. 27, to create the desired type and level of compression at different stages of use or donning of a garment.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

The invention claimed is:

1. A fabric comprising:
   a first plurality of filaments, each of the first plurality of filaments comprising a passive material; and
   a second plurality of heterogeneous filaments, each of the second plurality of heterogeneous filaments comprising a plurality of segments, each of the plurality of segments made of a different material from adjacent ones of the plurality of segments;
   wherein the first plurality of filaments are arranged in a knit pattern with each of the second plurality of heterogeneous filaments, and wherein the different materials vary from one another according to an attribute selected from the group consisting of: electrically-active, mechanically-active, and thermally-active features.

2. The fabric of claim 1, further comprising a power source, wherein the power source is configured to provide an electrical current through a circuit passing through the second plurality of heterogeneous filaments, the fabric further comprising a plurality of switches configured to open the circuit when a compression level of the garment exceeds a predefined maximum of between 1000 Pa and 1333 Pa.

3. The fabric of claim 2, wherein the circuit can be selectively closed or open based upon a signal from a controller.

4. A fabric comprising:
   a first plurality of filaments, each of the first plurality of filaments comprising a passive material; and
   a second plurality of heterogeneous filaments, each of the second plurality of heterogeneous filaments comprising an active material, wherein the second plurality of heterogeneous filaments are additively manufactured;
   wherein the first plurality of filaments are arranged in a knit pattern with each of the second plurality of filaments, and wherein the active material is a material that undergoes a phase transition at a predetermined temperature to generate a change in the fabric between a relaxed state and an activated state characterized by an actuation contraction of the knit pattern at least partially based upon a knit index, and wherein a second active material and the passive material are both components of the first plurality of filaments,
   and wherein one or more filaments of the second plurality of filaments include a sharp transition.

5. The active fabric of claim 1, wherein the active material comprises a plurality of materials each having different predetermined temperatures.

6. The active fabric of claim 1, further comprising a sensor.

7. A fabric comprising:
   a first portion made of a first material and extending across a first plurality of rows of continuous filaments, each of the first plurality of rows of continuous filaments arranged in a pattern of loops; and
   a second portion made of a second material and extending across a second plurality of rows of continuous filaments, each of the second plurality of rows of continuous filaments arranged in the pattern of loops;
   wherein at least one filament of the first plurality of rows of continuous filaments is also a filament of the second plurality of rows of continuous filaments, and the at least one filament includes a plurality of segments each made of a different material from adjacent ones of the plurality of segments, and
   wherein the plurality of segments vary from one another according to an attribute selected from the group consisting of: electrically-active, mechanically-active, and thermally-active features.

8. The fabric of claim 7, wherein the first plurality of rows of continuous filaments and the second plurality of rows of continuous filaments are both additively manufactured.

9. The fabric of claim 7, wherein each of the first plurality of rows of continuous filaments has a knit index configured to generate a desired level of compression.

10. The fabric of claim 7, wherein the first material is a conductive material.

11. The fabric of claim 8, wherein at least one of the first plurality of rows of continuous filaments and the second plurality of rows of continuous filaments includes a portion of heterogenous filaments.

12. The fabric of claim 11, wherein one or more filaments of the portion of heterogenous filaments include a sharp transition.

13. The fabric of claim 1, wherein the second plurality of heterogeneous filaments are produced by a process of additive manufacturing.

14. The fabric of claim 1, wherein the electrically-active, mechanically-active, and thermally-active features comprise at least one of: a shape memory transition temperature, an elasticity, a stiffness, a conductivity, an activation property, and a surface property.

15. The fabric of claim 1, wherein the plurality of segments are sized and positioned such that, when incorporated into the knit pattern with the first plurality of filaments, functional pathways are created through the fabric.

* * * * *